US011319402B2

(12) United States Patent
Hocke et al.

(10) Patent No.: US 11,319,402 B2
(45) Date of Patent: May 3, 2022

(54) METHOD FOR PRODUCING A POLYISOCYANATE POLYMER AND A POLYISOCYANURATE PLASTIC

(71) Applicant: COVESTRO INTELLECTUAL PROPERTY GMBH & CO. KG, Leverkusen (DE)

(72) Inventors: Heiko Hocke, Leverkusen (DE); Mathias Matner, Neuss (DE); Dirk Achten, Leverkusen (DE); Hans-Josef Laas, Odenthal (DE); Dieter Mager, Leverkusen (DE)

(73) Assignee: COVESTRO INTELLECTUAL PROPERTY GMBH & CO. KG, Leverkusen (DE)

( * ) Notice: Subject to any disclaimer, the term of this patent is extended or adjusted under 35 U.S.C. 154(b) by 0 days.

(21) Appl. No.: 17/053,822

(22) PCT Filed: May 13, 2019

(86) PCT No.: PCT/EP2019/062202
§ 371 (c)(1),
(2) Date: Nov. 9, 2020

(87) PCT Pub. No.: WO2019/219603
PCT Pub. Date: Nov. 21, 2019

(65) Prior Publication Data
US 2021/0246255 A1  Aug. 12, 2021

(30) Foreign Application Priority Data

May 17, 2018  (EP) .................................... 18172967

(51) Int. Cl.
| *C08G 18/09* | (2006.01) |
| *C08G 18/16* | (2006.01) |
| *C08G 18/18* | (2006.01) |
| *C08G 18/22* | (2006.01) |
| *C08G 18/72* | (2006.01) |
| *C08G 18/73* | (2006.01) |
| *C08G 18/75* | (2006.01) |
| *C08G 18/79* | (2006.01) |
| *C08J 5/04* | (2006.01) |
| *C09D 179/04* | (2006.01) |

(52) U.S. Cl.
CPC ......... *C08G 18/755* (2013.01); *C08G 18/092* (2013.01); *C08G 18/097* (2013.01); *C08G 18/161* (2013.01); *C08G 18/168* (2013.01); *C08G 18/1808* (2013.01); *C08G 18/225* (2013.01); *C08G 18/722* (2013.01); *C08G 18/73* (2013.01); *C08G 18/792* (2013.01); *C08J 5/043* (2013.01); *C09D 179/04* (2013.01); *C08G 2115/02* (2021.01); *C08J 2379/04* (2013.01)

(58) Field of Classification Search
CPC . C08G 18/092; C08G 18/097; C08G 2115/02
See application file for complete search history.

(56) References Cited

U.S. PATENT DOCUMENTS

| 3,211,703 A | 10/1965 | Gilman et al. |
| 3,330,828 A | 7/1967 | Grogler et al. |
| 3,487,080 A | 12/1969 | Matsui et al. |
| 3,996,223 A | 12/1976 | Gupta et al. |
| 4,040,992 A | 8/1977 | Bechara et al. |
| 4,255,569 A | 3/1981 | Muller et al. |
| 4,265,798 A | 5/1981 | Mishra |
| 4,288,586 A | 9/1981 | Bock et al. |
| 4,324,879 A | 4/1982 | Bock et al. |
| 4,379,905 A | 4/1983 | Stemmler et al. |
| 4,419,513 A | 12/1983 | Breidenbach et al. |
| 4,487,928 A | 12/1984 | Richter et al. |
| 4,499,253 A | 2/1985 | Kerimis et al. |
| 4,604,418 A | 8/1986 | Shindo et al. |
| 4,789,705 A | 12/1988 | Kase et al. |
| 4,837,359 A | 6/1989 | Woynar et al. |
| 4,960,848 A | 10/1990 | Scholl et al. |
| 4,994,541 A | 2/1991 | Dell et al. |
| 5,013,838 A | 5/1991 | Scholl |
| 5,064,960 A | 11/1991 | Pedain et al. |
| 5,076,958 A | 12/1991 | Pedain et al. |
| 5,489,663 A | 2/1996 | Brandt et al. |
| 5,914,383 A | 6/1999 | Richter et al. |
| 6,107,484 A | 8/2000 | Richter et al. |
| 7,001,973 B2 | 2/2006 | Kohlstruk et al. |
| 7,067,654 B2 | 6/2006 | Richter et al. |

(Continued)

FOREIGN PATENT DOCUMENTS

| DE | 1954093 A1 * | 6/1970 | ........... C08G 18/022 |
| DE | 1670666 A1 * | 7/1971 | ......... C08G 18/7887 |

(Continued)

OTHER PUBLICATIONS

European Polymer Journal, vol. 16, 147-148 (1980).
European Polymer Journal, vol. 16, 831-833 (1980).
Journal of Polymer Science Part A: Polymer Chemistry 2013, 51, 2631-2637.
Theo Flipsen: "Design, synthesis and properties of new materials based on densely crosslinked polymers for polymer optical fiber and amplifier applications", Rijksuniversiteit Groningen, 2000.
J. PraktChem. 336 (1994) 185-200.

(Continued)

*Primary Examiner* — Melissa A Rioja
(74) *Attorney, Agent, or Firm* — Jed C. Benson

(57) ABSTRACT

The invention relates to a method for producing a polyisocyanate polymer and to the polyisocyanate polymer obtainable from the method and to the use thereof as part of a two-stage method for producing a polyisocyanurate plastic, in particular for producing coatings, films, semi-finished products or molded parts containing such a polyisocyanurate plastic.

14 Claims, No Drawings

(56) References Cited

U.S. PATENT DOCUMENTS

| | | |
|---|---|---|
| 7,091,341 B2 | 8/2006 | Revelant et al. |
| 7,709,680 B2 | 5/2010 | Richter et al. |
| 8,119,799 B2 | 2/2012 | Binder et al. |
| 8,742,166 B2 | 6/2014 | Lucas et al. |
| 9,926,402 B2 | 3/2018 | Laas et al. |
| 10,590,226 B2 | 3/2020 | Matner et al. |
| 10,597,484 B2 | 3/2020 | Achten et al. |
| 10,752,723 B2 | 8/2020 | Laas et al. |
| 2004/0106762 A1 | 6/2004 | Charriere et al. |
| 2006/0155095 A1 | 7/2006 | Daussin et al. |

FOREIGN PATENT DOCUMENTS

| | | | |
|---|---|---|---|
| DE | 1667309 A1 * | 9/1972 | ........... C08G 18/161 |
| DE | 2414413 A1 | 10/1975 | |
| DE | 2452532 A * | 5/1976 | |
| DE | 2631733 A1 * | 2/1977 | ........... C08G 18/022 |
| DE | 2641380 A * | 3/1978 | |
| DE | 3240613 A1 | 5/1984 | |
| DE | 3700209 A * | 7/1988 | |
| DE | 3928503 A * | 3/1991 | |
| EP | 0013880 A1 | 8/1980 | |
| EP | 0047452 A1 * | 3/1982 | ........... C08G 18/792 |
| EP | 0100129 A1 | 2/1984 | |
| EP | 0102482 A2 * | 3/1984 | ........... C08G 18/791 |
| EP | 330966 A * | 9/1989 | |
| EP | 0330966 A2 | 9/1989 | |
| EP | 0336205 A2 * | 10/1989 | ......... C08G 18/3221 |
| EP | 0339396 A1 * | 11/1989 | ......... C08G 18/1875 |
| EP | 0443167 A1 | 8/1991 | |
| EP | 0668271 A1 * | 8/1995 | ........... C07D 251/34 |
| EP | 0671426 A1 | 9/1995 | |
| EP | 0798299 A1 * | 10/1997 | ........... C07D 251/32 |
| EP | 0896009 A1 | 2/1999 | |
| EP | 0962455 A1 * | 12/1999 | ........... C07D 273/04 |
| EP | 1599526 A1 * | 11/2005 | ........... C08G 18/792 |
| EP | 3162548 A1 | 5/2017 | |
| GB | 809809 A | 3/1959 | |
| GB | 952931 A | 3/1964 | |
| GB | 966338 A | 8/1964 | |
| GB | 1145952 A | 3/1969 | |
| GB | 1244416 A | 9/1971 | |
| GB | 1386399 A | 3/1975 | |
| GB | 1391066 A | 4/1975 | |
| GB | 2221465 A | 2/1990 | |
| GB | 2222161 A | 2/1990 | |
| WO | WO-2005087828 A1 * | 9/2005 | ........... C08G 18/022 |
| WO | WO-2013167404 A1 * | 11/2013 | ......... C08G 18/1875 |

OTHER PUBLICATIONS

Justus Liebigs Annalen der Chemie, vol. 562 (1949) p. 75-136.
European Polymer Journal, vol. 16, 147-148 (1979).
J. H. Saunders and K. C. Frisch, Polyurethanes Chemistry and Technology, p. 94 ff. (1962).
International Search Report, PCT/EP2019/062202, dated Aug. 21, 2019, Authorized officer: Martin Sütterlin.

\* cited by examiner

US 11,319,402 B2

METHOD FOR PRODUCING A POLYISOCYANATE POLYMER AND A POLYISOCYANURATE PLASTIC

CROSS-REFERENCE TO RELATED APPLICATION

This application is a national stage application under 35 U.S.C. § 371 of PCT/EP2019/062202, filed May 13, 2019, which claims the benefit of European Application No. 18172967, filed May 17, 2018, each of which is incorporated herein by reference.

FIELD

The invention relates to a process for preparing a polyisocyanate polymer and to the polyisocyanate polymer obtainable from the process and to the use thereof as part of a two-stage process for producing a polyisocyanurate plastic, especially for producing coatings, films, semifinished products or moldings comprising such a polyisocyanurate plastic.

BACKGROUND

Two-stage crosslinking reactions for production of polymer materials are of interest in various fields, for example for the production of coatings, films or else moldings. Ideally, the first reaction stage here allows defined pre-crosslinking to give a prepolymer, which is fully crosslinked in a second stage to give the ultimate polymer material.

Polymers with polyisocyanurate structure components are basically known for their good thermal stability and chemical resistance. Particularly polyisocyanurates based on aliphatic isocyanates have good weathering stability. However, the complete trimerization of diisocyanates to give polyisocyanurate plastics is difficult to control. This is especially because the exothermicity of the trimerization reaction to give polyisocyanurate plastics proceeding from monomeric diisocyanates, particularly in the case of monomeric diisocyanates with high isocyanate content (e.g. BDI, PDI, HDI, TIN), is very high (−75 kJ/mol NCO), such that a reaction cannot be performed in a practical manner. This is especially true with regard to the large scale required for industrial applications and adiabatic conditions as typically occur within solids in the case of highly exothermic polymerization processes.

An adiabatic change of state is a thermodynamic operation in which a system is converted from one state to another without exchanging thermal energy with its environment. "Adiabatic conditions" is understood to mean here that complete dissipation of the heat of reaction released in the exothermic reaction to the environment is not possible. It is thus typically impossible to achieve homogeneous conditions in solids, and "adiabatic" conditions that exist particularly within the solids in the case of fast reactions can lead to a locally significant increase in temperature in the case of an exothermic reaction. These local hotspots are extremely critical where the production of functionally homogeneous products is concerned. In the prior art, complete trimerization to polyisocyanurate plastics has therefore been effected to date only in small amounts of substance under strict temperature control.

For example, European Polymer Journal, vol. 16, 147-148 (1980) describes the slow catalytic trimerization of monomeric 1,6-diisocyanatohexane (HDI) at 40° C. to give a clear transparent polyisocyanurate plastic free of isocyanate groups. For this purpose, however, 15% by weight of dibutyltin dimethoxide is required as trimerization catalyst.

European Polymer Journal, Vol. 16, 831-833 (1980) describes complete trimerization of monomeric HDI to give a polyisocyanurate at a temperature of 140° C. using 6% by weight of tributyltin oxide as catalyst.

Journal of Polymer Science Part A: Polymer Chemistry 2013, 51, 2631-2637 describes the preparation of optically transparent polyisocyanurate films based on monomeric HDI/MDI mixtures with sodium p-toluenesulfinate as catalyst. Using exclusively monomeric HDI as starting diisocyanate, however, it is not possible to obtain clear films with this catalyst, since the reaction mixture foams significantly because of the extreme exothermicity of the trimerization reaction. According to this publication, the synthesis of a pure HDI polyisocyanurate was possible only in a test tube, on the mmol scale in organic solution after complex workup.

The thesis by Theo Flipsen: "Design, synthesis and properties of new materials based on densely crosslinked polymers for polymer optical fiber and amplifier applications", Rijksuniversiteit Groningen, 2000 describes the slow, thermally controlled trimerization of monomeric HDI with a neodymium/crown ether complex as catalyst. The polyisocyanurate obtained, which is said to have good optical, thermal and mechanical properties, was examined in the context of the thesis for its suitability for optical applications, especially as polymeric optical fiber.

It is apparent from the above-cited prior art that temperature control in the preparation of highly converted polyisocyanurates is of enormous significance since, owing to the high isocyanate contents of the monomeric starting materials, under adiabatic conditions as typically exist in trimerizations in solids, owing to the exothermic reaction, temperatures exceeding 300° C. can arise, i.e. above the flashpoint of monomeric HDI at 140° C. and the boiling point of monomeric HDI of 255° C. and even up to the self-ignition temperature of HDI of 454° C. The high temperatures can lead to direct breakdown of the products and even to in situ evaporation and self-ignition of the monomeric diisocyanates.

As well as the detriments to occupational hygiene resulting from the monomeric diisocyanates or breakdown products released, the formation of blisters and the occurrence of discoloration at relatively high temperatures are very troublesome here. Blisters are formed, for example, as a result of side reactions through uretdione formation and subsequent carbodiimidization with elimination of carbon dioxide. The solids produced proceeding from the monomeric diisocyanates therefore typically have blisters and hence cannot satisfy particular requirements with regard to density, electrical insulation characteristics and mechanical properties. The discoloration is likewise caused by side reactions that lead to yellow to brown by-products. Typically, polyisocyanurate plastics that have been produced proceeding from monomeric diisocyanates at relatively high temperatures are therefore usually discolored.

For that reason, polyisocyanurates have typically found practical use in paint chemistry to date solely as low-viscosity monomeric or oligomeric crosslinking agents, the production of which involves stopping the trimerization reaction at only low conversions by deactivating the catalyst and removing excess unreacted monomeric diisocyanate. Thus, DE 31 00 263; GB 952 931, GB 966 338; U.S. Pat. Nos. 3,211,703, 3,330,828, EP 0 056 159 B1 and DE 32 19 608 A1 envisage conducting the reaction either in dilution or only up to low conversion values with very precise temperature control in the production of crosslinking agents based on monomeric or oligomeric polyisocyanurates proceeding from aliphatic and mixed aliphatic and aromatic monomeric diisocyanates. There is specifically no formation here of fully crosslinked polyisocyanurate plastics, only formation of oligomeric, soluble prepolymers of low viscosity.

Better temperature control in the trimerization of isocyanates can be achieved by the use of oligomeric polyisocyanates, as described, for example, in WO 2016/170057, WO 2016/170059 or WO 2016/170061.

In the case of shaped bodies having an unfavorable surface-to-volume ratio, however, there is still the problem here of dissipation of heat. Consequently, production processes for polyisocyanurate plastics in which the generation of heat of reaction can be even better controlled are desirable.

Moreover, the production processes described in WO 2016/170057, WO 2016/170059 and WO 2016/170061, in a single process step, lead to fully cured polyisocyanurate plastics. However, it is desirable to provide processes in which a preliminary product that is storable and transportable but still deformable is obtained at first. This preliminary product can be produced centrally and then processed further to give the desired end product elsewhere.

SUMMARY

It was thus an object of the invention to provide production processes for polyisocyanurate plastics that meet the demands set out above.

This object is achieved by the embodiments of the invention described in the patent claims and in the description.

The present invention relates to a process for producing a polyisocyanurate plastic D, comprising the steps of
a) providing a polyisocyanate polymer C,
  (i) containing uretdione groups;
  (ii) containing a catalyst B2 that catalyzes the reaction of uretdione groups to give isocyanurate groups; and
  (iii) characterized by a modulus G' determined by a plate/plate rheometer to ISO 6721-10:2015-09 at 1/s at 23° C. of at least $1*10^6$ Pa;
b) catalytically trimerizing the polyisocyanate polymer C to give a polyisocyanurate plastic D at a temperature of at least 100° C., this temperature being at least 20° C. higher than the temperature at which the catalytic polymerization to prepare the polyisocyanate polymer C was performed.

What is meant here by "providing the polyisocyanate C" is that the polyisocyanate polymer C is in a form in which it can be used for production of the polyisocyanurate plastic D. This naturally requires the preparation of the polyisocyanate C, which can be effected by an outside supplier, such that the polyisocyanate polymer C is provided by purchase.

The present invention further relates to a process for producing a polyisocyanurate plastic D, comprising the steps of
a) providing a reaction mixture having a molar ratio of isocyanate groups to isocyanate-reactive groups of at least 3:1, containing
  (i) a polyisocyanate composition A,
  (ii) a catalyst B1 that catalyzes the reaction of isocyanate groups to give uretdione groups, and
  (iii) a catalyst B2 that catalyzes the reaction of isocyanate and uretdione groups to give isocyanurate groups, where catalyst B1 is different than catalyst B2;
b) catalytically polymerizing the polyisocyanate composition A to give a polyisocyanate polymer C which is characterized by
  (i) the presence of uretdione groups; and
  (ii) a modulus G' determined by a plate/plate rheometer to ISO 6721-10:2015-09 at 1/s at 23° C. of $\geq 1*10^6$ Pa;
wherein the polymerization is conducted at an average temperature of not more than 100° C. over a period of 30 min up to 14 days; and
c) catalytically trimerizing the polyisocyanate polymer C at a temperature of at least 100° C. to give a polyisocyanurate plastic D, this temperature being at least 20° C. higher than the temperature at which the catalytic polymerization to prepare the polyisocyanate polymer C was performed in process step b).

DETAILED DESCRIPTION

The process according to the invention has two stages. In a first process step, catalytic polymerization of a polyisocyanate composition produces a storage-stable and transportable polyisocyanate polymer C. This semifinished product is then converted in a second step of catalytic trimerization to give the finished, fully cured isocyanurate plastic D. For implementation of this process, the reaction mixture must contain two catalysts: a catalyst B1 that is active at relatively low temperatures and catalyzes the formation of uretdione groups for performance of the catalytic polymerization, and a catalyst B2 other than B1 that becomes active only at higher temperatures and catalyzes predominantly the formation of isocyanurate groups or conversion of uretdione to isocyanurate groups.

The reaction mixture used to prepare the polyisocyanate polymer C by catalytic polymerization has a molar ratio of isocyanate groups to isocyanate-reactive groups of at least 3:1, preferably at least 5:1 and more preferably at least 10:1. "Isocyanate-reactive groups" in the context of this application are hydroxyl, amino and thiol groups.

The present invention is based on the surprising observation that the catalytic conversion of a polyisocyanate composition A in the presence of two different catalysts B1 and B2 can be controlled in such a way that the crosslinking proceeds as a two-stage process, giving two different polymers, the first of which can be converted irreversibly to the second.

The process according to the invention is particularly efficient. For instance, in the process according to the invention, catalysts B1 and B2 are present in the reaction mixture from the start. The polyisocyanate polymer C formed by the catalytic polymerization thus already contains all the constituents required for the subsequent catalytic trimerization. Consequently, it is not necessary to purify the polyisocyanate polymer C formed, nor is there any need to mix it with further components prior to the catalytic trimerization. Moreover, the polyisocyanate polymer C according to the invention can be industrially handled easily and safely, and can be converted to the polyisocyanurate plastic D by simple heating. This enables simple production of the polyisocyanurate plastic D on the basis of an already crosslinked polymeric precursor C.

The two-stage process regime according to the invention has the particular advantage that a polyisocyanate polymer C that can be produced, stored and sold as such is obtained as intermediate. Since the product of the catalytic polymerization has a relatively low glass transition temperature, generally less than 60° C., it can be re-shaped prior to the performance of the catalytic trimerization and fixed in the new form by the subsequent catalytic trimerization. For instance, it is possible to provide semifinished products that can be processed further even after a prolonged period and at other sites to give the end product without great cost and inconvenience.

The process regime according to the invention has the further advantage that, using a polymer C, the catalytic trimerization can be performed very quickly and the polyisocyanurate plastic D can be produced with only very minor material shrinkage. According to the invention, material shrinkage proceeding from polyisocyanate polymer C is ≤5%, preferably ≤3% and most preferably ≤2%. Material shrinkage is calculated via the change in density. This permits efficient production of precision components, for example for the automotive and electronics industries.

The first stage of the process according to the invention can especially also be effected continuously since continuous production processes in many cases offer economic advantages. In an entirely flexible manner and independently of the production of the polyisocyanate polymer C, it is then possible to effect the catalytic trimerization at another time and/or at another place, i.e. the curing of the polyisocyanate polymer C to give the desired polyisocyanurate plastic D.

A further aspect of the concept of the invention is to at first obtain, by the catalytic polymerization, an intermediate containing semi-stable groups that are stable under the conditions of storage and at the same time bring about polymerization of the reaction mixture or a significant rise in viscosity, but break down at the appropriate process temperatures and lead to stable chemical bonds in the finished component.

The process product of the catalytic polymerization may be in the form of a coating, or in the form of a shaped body without fillers, or it may be mixed with suitable fillers of any geometry. The polyisocyanurate plastic D is characterized by good fire performance and high resistance to weathering influences and chemicals.

The individual process steps and the components used for preparation of the polyisocyanate polymer C are described in detail hereinafter.

If reaction temperatures are cited hereinafter, this means the temperature to which the reaction mixture is heated in the course of the reaction or to which it is heated by external heat sources. Unless defined otherwise, temperatures are not peak temperatures but average temperatures that are established as average over a defined period of the reaction during the catalytic polymerization and the catalytic trimerization. The minimum period of time for determination of an average temperature is at least 10 minutes, preferably at least 20 minutes and most preferably at least 30 minutes. Peak temperatures attained during the process step in question must not exceed the average by more than 100%, preferably by not more than 50% (based on the Celsius temperature scale).

Polyisocyanate Composition A

"Polyisocyanate composition A" in the context of the invention refers to the isocyanate component in the initial reaction mixture. In other words, this is the sum total of all compounds in the initial reaction mixture that have isocyanate groups. The polyisocyanate composition A is thus used as reactant in the process according to the invention. Where reference is made here to "polyisocyanate composition A", especially to "providing the polyisocyanate composition A", this means that the polyisocyanate composition A exists and is used as reactant.

The term "polyisocyanate" as used here is a collective term for compounds containing two or more isocyanate groups (this is understood by the person skilled in the art to mean free isocyanate groups of the general structure —N═C═O) in the molecule. The simplest and most important representatives of these polyisocyanates are the diisocyanates. These have the general structure O═C═N—R—N═C═O where R typically represents aliphatic, alicyclic and/or aromatic radicals.

Because of the polyfunctionality (≥2 isocyanate groups), it is possible to use polyisocyanates to produce a multitude of polymers (e.g. polyurethanes, polyureas and polyisocyanurates) and oligomeric compounds (for example those having urethane, urea, uretdione, isocyanurate, allophanate, biuret, iminooxadiazinedione and/or oxadiazinetrione structure).

Where reference is made here to "polyisocyanates" in general terms, this means monomeric and/or oligomeric polyisocyanates alike. For the understanding of many aspects of the invention, however, it is important to distinguish between monomeric diisocyanates and oligomeric polyisocyanates. Where reference is made here to "oligomeric polyisocyanates", this means polyisocyanates formed from at least two monomeric diisocyanate molecules, i.e. compounds that contain or consist of a reaction product formed from at least two monomeric diisocyanate molecules.

The preparation of oligomeric polyisocyanates from monomeric diisocyanates is also referred to here as modification of monomeric diisocyanates. This "modification" as used here means the reaction of monomeric diisocyanates to give oligomeric polyisocyanates having urethane, urea, uretdione, isocyanurate, allophanate, biuret, iminooxadiazinedione and/or oxadiazinetrione structures.

For example, hexamethylene diisocyanate (HDI) is a "monomeric diisocyanate" since it contains two isocyanate groups and is not a reaction product of at least two polyisocyanate molecules:

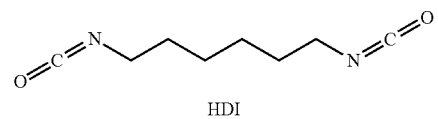

HDI

By contrast, reaction products of at least two HDI molecules which still have at least two isocyanate groups are "oligomeric polyisocyanates" in the context of the invention. Proceeding from monomeric HDI, representatives of such "oligomeric polyisocyanates" include for example HDI isocyanurate and HDI biuret which are each constructed from three monomeric HDI units:

(idealized structural formulae)

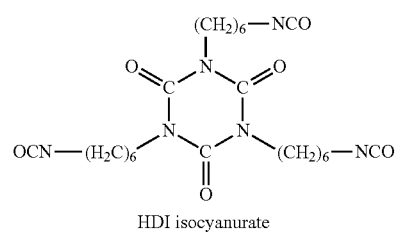

HDI isocyanurate

-continued

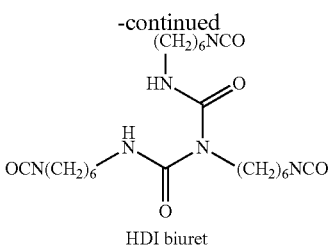

HDI biuret

In one embodiment of the invention, the polyisocyanate composition A contains monomeric and/or oligomeric polyisocyanates. In a further embodiment of the invention, the polyisocyanate composition A consists entirely or to an extent of at least 25%, 40%, 60%, 80%, 85%, 90%, 95%, 98%, 99% or 99.5% by weight, based in each case on the weight of the polyisocyanate composition A, of monomeric polyisocyanates. Mixtures of monomeric and oligomeric polyisocyanates can be used particularly advantageously in order to adjust the viscosity of the polyisocyanate composition A. The monomeric polyisocyanates may be used here as reactive diluents in order to lower the viscosity of the oligomeric polyisocyanates.

In an alternative embodiment of the invention, the polyisocyanate composition A used as reactant in the crosslinking contains predominantly oligomeric polyisocyanates and has a low level of monomeric polyisocyanates. In one embodiment of the invention, the polyisocyanate composition A consists entirely or to an extent of at least 25%, 40%, 60%, 80%, 85%, 90%, 95%, 98%, 99% or 99.5% by weight, based in each case on the weight of the polyisocyanate composition A, of oligomeric polyisocyanates. This content of oligomeric polyisocyanates is based on the polyisocyanate composition A, meaning that they are not formed, for instance, as intermediate during the process according to the invention, but are already present in the polyisocyanate composition A used as reactant on commencement of the reaction.

"Low in monomers" and "low in monomeric polyisocyanates" is used here synonymously in relation to the polyisocyanate composition A.

Since monomeric polyisocyanates are volatile, it may be advantageous for reasons of operational safety when the polyisocyanate composition A has a proportion of monomeric polyisocyanates in the polyisocyanate composition A of not more than 20% by weight, especially not more than 15% by weight or not more than 10% by weight, based in each case on the weight of the polyisocyanate composition A. Preferably, the polyisocyanate composition A has a content of monomeric polyisocyanates of not more than 5% by weight, preferably not more than 2.0% by weight, more preferably not more than 1.0% by weight, based in each case on the weight of the polyisocyanate composition A. Particularly good results are established when the polymer composition A is essentially free of monomeric polyisocyanates. "Essentially free" means here that the content of monomeric polyisocyanates is not more than 0.3% by weight, preferably not more than 0.1% by weight, based on the weight of the polyisocyanate composition A.

Low-monomer polyisocyanate compositions A can be obtained in that the modification of a monomeric starting isocyanate is followed by a further process step for removal of the unconverted excess monomeric polyisocyanates. This removal of monomers can be effected in a manner of particular practical relevance by methods known per se, preferably by thin-film distillation under high vacuum or by extraction with suitable solvents that are inert toward isocyanate groups, for example aliphatic or cycloaliphatic hydrocarbons such as pentane, hexane, heptane, cyclopentane or cyclohexane.

In one embodiment of the invention, the polyisocyanate composition A according to the invention is obtained by modifying monomeric polyisocyanates with subsequent removal of unconverted monomers.

In a further particular embodiment of the invention, the polyisocyanate composition A may comprise a mixture of various isocyanates. Blending of isocyanates can be advantageous for achieving specific technical effects, for example a particular hardness or glass transition temperature (Tg). Results of particular practical relevance are established when the polyisocyanate composition A has a proportion of monomeric diisocyanates in the polyisocyanate composition A of not more than 45% by weight, especially not more than 15% by weight or not more than 10% by weight, based in each case on the weight of the polyisocyanate composition A. Preferably, the polyisocyanate composition A has a content of monomeric diisocyanate of not more than 5% by weight, especially not more than 2.0% by weight, more preferably not more than 1.0% by weight, based in each case on the weight of the polyisocyanate composition A.

In a further embodiment of the process according to the invention, the polyisocyanate composition A has a proportion of reactive isocyanate groups in the monomeric diisocyanate, based on the total number of all reactive isocyanate groups in the polyisocyanate composition A, of not more than 45%, especially not more than 25% or not more than 10%. Preferably, the polyisocyanate composition A has a content of monomeric diisocyanate groups of not more than 5%, preferably not more than 2.0%, more preferably not more than 1.0%, based in each case on the total number of all reactive isocyanate groups in the polyisocyanate composition A.

In a further particular embodiment of the process according to the invention, the polyisocyanate composition A may contain monomeric monoisocyanates or monomeric polyisocyanates having an isocyanate functionality greater than two or less than two, i.e. having more than two or less than two isocyanate groups per molecule. The addition of monomeric monoisocyanates has been found to be advantageous in order to influence the network density of the polyisocyanurate plastic D. Results of particular practical relevance are established when the polyisocyanate composition A has a proportion of monomeric monoisocyanates or monomeric isocyanates having an isocyanate functionality of less than two in the polyisocyanate composition A of less than 50% by weight, especially less than 15% by weight or less than 10% by weight, based in each case on the weight of the polyisocyanate composition A. Preferably, the polyisocyanate composition A has a content of monomeric monoisocyanates or monomeric isocyanates having an isocyanate functionality of less than two of not more than 5% by weight, especially not more than 2.0% by weight, more preferably not more than 1.0% by weight, based in each case on the weight of the polyisocyanate composition A.

The oligomeric polyisocyanates described here are typically obtained by modifying simple aliphatic, cycloaliphatic, araliphatic and/or aromatic monomeric diisocyanates or mixtures of such monomeric diisocyanates.

According to the invention, the oligomeric polyisocyanates may in particular have urethane, urea, uretdione, isocyanurate, allophanate, biuret, iminooxadiazinedione and/or oxadiazinetrione structure. In one embodiment of the invention, the oligomeric polyisocyanates have at least one of the following oligomeric structure types or mixtures thereof:

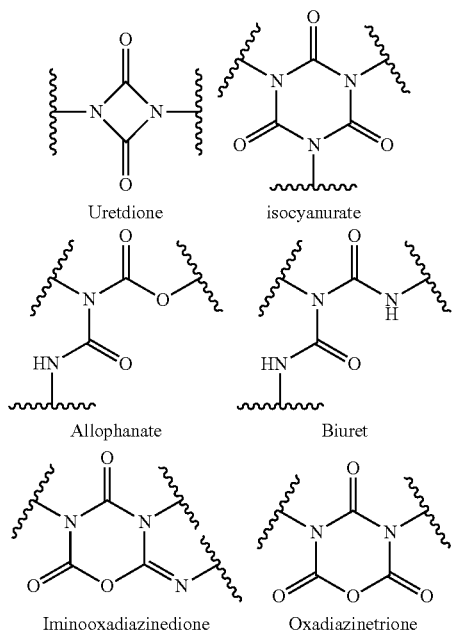

It has been found that, surprisingly, it can be advantageous to use oligomeric polyisocyanates that are a mixture of at least two oligomeric polyisocyanates, wherein the at least two oligomeric polyisocyanates differ in terms of structure. This structure is preferably selected from the group consisting of urethane, urea, uretdione, isocyanurate, allophanate, biuret, iminooxadiazinedione and oxadiazinetrione structures, and mixtures thereof. Starting mixtures of this kind can especially lead, by comparison with trimerization reactions with oligomeric polyisocyanates of just one defined structure, to an effect on the Tg value and mechanical values such as hardness, scratch resistance, or gloss and tactile properties, which is advantageous for many applications.

Preference is given to using, in the process according to the invention, a polyisocyanate composition A consisting of at least one oligomeric polyisocyanate having urethane, urea, biuret, allophanate, isocyanurate and/or iminooxadiazinedione structure and mixtures thereof.

In another embodiment, the polyisocyanate composition A containing oligomeric polyisocyanates is one containing only a single defined oligomeric structure, for example exclusively or for the most part an isocyanurate structure. In the context of the present invention, a polyisocyanate composition A is regarded as a polyisocyanate composition of a single defined oligomeric structure when an oligomeric structure selected from urethane, urea, uretdione, isocyanurate, allophanate, biuret, iminooxadiazinedione and/or oxadiazinetrione structures is present to an extent of at least 50 mol %, preferably 60 mol %, more preferably 70 mol %, especially preferably 80 mol % and particularly 90 mol %, based in each case on the sum total of the oligomeric structures from the group consisting of urethane, urea, uretdione, isocyanurate, allophanate, biuret, iminooxadiazinedione and oxadiazinetrione structures present in the polyisocyanate composition A.

In a further embodiment, the oligomeric polyisocyanates are those which have mainly isocyanurate structures and which may contain the abovementioned urethane, urea, uretdione, allophanate, biuret, iminooxadiazinedione and/or oxadiazinetrione structure only as by-products. Thus, one embodiment of the invention envisages the use of a polymer composition A of a single defined oligomeric structure, the oligomeric structure being an isocyanurate structure and being present to an extent of at least 50 mol %, preferably 60 mol %, more preferably 70 mol %, especially preferably 80 mol % and particularly 90 mol %, based in each case on the sum total of the oligomeric structures from the group consisting of urethane, urea, uretdione, isocyanurate, allophanate, biuret, iminooxadiazinedione and oxadiazinetrione structures present in the polyisocyanate composition A.

It is likewise possible according to the invention to use oligomeric polyisocyanates having very substantially no isocyanurate structure, and containing mainly at least one of the abovementioned urethane, urea, uretdione, allophanate, biuret, iminooxadiazinedione and/or oxadiazinetrione structure types. In a particular embodiment of the invention, the polyisocyanate composition A consists to an extent of 50 mol %, preferably 60 mol %, more preferably 70 mol %, especially preferably 80 mol % and particularly 90 mol %, based in each case on the sum total of the oligomeric structures from the group consisting of urethane, urea, uretdione, isocyanurate, allophanate, biuret, iminooxadiazinedione and oxadiazinetrione structures present in the polyisocyanate composition A, of oligomeric polyisocyanates having a structure type selected from the group consisting of urethane, urea, uretdione, allophanate, biuret, iminooxadiazinedione and/or oxadiazinetrione structures.

A further embodiment of the invention envisages the use of a low-isocyanurate polyisocyanate composition A having, based on the sum total of the oligomeric structures from the group consisting of urethane, urea, uretdione, isocyanurate, allophanate, biuret, iminooxadiazinedione and oxadiazinetrione structures present in the polyisocyanate composition A, less than 50 mol %, preferably less than 40 mol %, more preferably less than 30 mol % and especially preferably less than 20 mol %, 10 mol % or 5 mol % of isocyanurate structures.

A further embodiment of the invention envisages the use of a polymer composition A of a single defined oligomeric structure type, said oligomeric structure type being selected from the group consisting of urethane, urea, uretdione, allophanate, biuret, iminooxadiazinedione and/or oxadiazinetrione structures and this structure type being present to an extent of at least 50 mol %, preferably 60 mol %, more preferably 70 mol %, especially preferably 80 mol % and particularly 90 mol %, based on the sum total of the oligomeric structures from the group consisting of urethane, urea, uretdione, isocyanurate, allophanate, biuret, iminooxadiazinedione and oxadiazinetrione structures present in the polyisocyanate composition A.

The proportions of urethane, urea, uretdione, isocyanurate, allophanate, biuret, iminooxadiazinedione and/or oxadiazinetrione structure in the polyisocyanate composition A may be determined, for example, by NMR spectroscopy. It is possible here with preference to use $^{13}$C NMR spectroscopy, preferably in proton-decoupled form, since the oligomeric structures mentioned give characteristic signals.

Irrespective of the underlying oligomeric structure type (urethane, urea, uretdione, isocyanurate, allophanate, biuret, iminooxadiazinedione and/or oxadiazinetrione structure), the polyisocyanate composition A for use in the process according to the invention preferably has an (average) NCO functionality of 1.3 to 10.0, preferably of 2.0 to 5.0, more preferably of 2.3 to 4.5.

Results of particular practical relevance are obtained when the polyisocyanate composition A to be used according to the invention has a content of isocyanate groups of 1.0% to 60.0% by weight. It has been found to be of particular practical relevance when the polyisocyanate composition A according to the invention has a content of isocyanate groups of 8.0% to 50.0% by weight, preferably of 14.0% to 30.0% by weight, based in each case on the weight of the polyisocyanate composition A.

Preparation processes for oligomeric polyisocyanates having urethane, urea, uretdione, isocyanurate, allophanate, biuret, iminooxadiazinedione and/or oxadiazinetrione structure are described, for example, in J. PraktChem. 336 (1994) 185-200, in DE-A 1 670 666, DE-A 1 954 093, DE-A 2 414 413, DE-A 2 452 532, DE-A 2 641 380, DE-A 3 700 209, DE-A 3 900 053 and DE-A 3 928 503 or in EP-A 0 336 205, EP-A 0 339 396 and EP-A 0 798 299.

In an additional or alternative embodiment of the invention, the polyisocyanate composition A is defined in that it contains oligomeric polyisocyanates which have been obtained from monomeric polyisocyanates, irrespective of the nature of the modification reaction used, with observation of an oligomerization level of 5% to 45%, preferably 10% to 40%, more preferably 15% to 30%. "Oligomerization level" is understood here to mean the percentage of isocyanate groups originally present in the starting mixture which are consumed during the production process to form urethane, urea, uretdione, isocyanurate, allophanate, biuret, iminooxadiazinedione and/or oxadiazinetrione structures.

Suitable monomeric polyisocyanates for the polyisocyanate composition A or starting compounds for the oligomeric polyisocyanates are any desired monomeric polyisocyanates obtainable in various ways, for example by phosgenation in the liquid or gas phase or by a phosgene-free route, for example by thermal urethane cleavage. Particularly good results are established when the monomeric polyisocyanates are monomeric diisocyanates. Preferred monomeric diisocyanates are those having a molecular weight in the range from 140 to 400 g/mol, having aliphatically, cycloaliphatically, araliphatically and/or aromatically bonded isocyanate groups, for example 1,4-diisocyanatobutane (BDI), 1,5-diisocyanatopentane (PDI), 1,6-diisocyanatohexane (HDI), 2-methyl-1,5-diisocyanatopentane, 1,5-diisocyanato-2,2-dimethylpentane, 2,2,4- or 2,4,4-trimethyl-1,6-diisocyanatohexane, 1,10-diisocyanatodecane, 1,3- and 1,4-diisocyanatocyclohexane, 1,4-diisocyanato-3,3,5-trimethylcyclohexane, 1,3-diisocyanato-2-methylcyclohexane, 1,3-diisocyanato-4-methylcyclohexane, 1-isocyanato-3,3,5-trimethyl-5-isocyanatomethylcyclohexane (isophorone diisocyanate; IPDI), 1-isocyanato-1-methyl-4(3)-isocyanatomethylcyclohexane, 2,4'- and 4,4'-diisocyanatodicyclohexylmethane (H12MDI), 1,3- and 1,4-bis(isocyanatomethyl)cyclohexane, bis(isocyanatomethyl)norbornane (NBDI), 4,4'-diisocyanato-3,3'-dimethyldicyclohexylmethane, 4,4'-diisocyanato-3,3',5,5'-tetramethyldicyclohexylmethane, 4,4'-diisocyanato-1,1'-bi(cyclohexyl), 4,4'-diisocyanato-3,3'-dimethyl-1,1'-bi(cyclohexyl), 4,4'-diisocyanato-2,2',5,5'-tetramethyl-1,1'-bi(cyclohexyl), 1,8-diisocyanato-p-menthane, 1,3-diisocyanatoadamantane, 1,3-dimethyl-5,7-diisocyanatoadamantane, 1,3- and 1,4-bis(isocyanatomethyl)benzene (xylylene diisocyanate; XDI), 1,3- and 1,4-bis(1-isocyanato-1-methylethyl)benzene (TMXDI) and bis(4-(1-isocyanato-1-methylethyl)phenyl) carbonate, 2,4- and 2,6-diisocyanatotoluene (TDI), 2,4'- and 4,4'-diisocyanatodiphenylmethane (MDI), polycyclic isomeric diisocyanatophenylmethanes, 1,5-diisocyanatonaphthalene and any desired mixtures of such diisocyanates. Further diisocyanates that are likewise suitable can additionally be found, for example, in *Justus Liebigs Annalen der Chemie*, volume 562 (1949) p. 75-136.

In addition, it is also possible in the process according to the invention to use conventional prepolymers bearing aliphatic or aromatic isocyanate end groups, for example polyether, polyester or polycarbonate prepolymers bearing aliphatic or aromatic isocyanate end groups, as polyisocyanates in the polyisocyanate composition A.

Suitable monomeric monoisocyanates which can optionally be used in the polyisocyanate composition A are, for example, n-butyl isocyanate, n-amyl isocyanate, n-hexyl isocyanate, n-heptyl isocyanate, n-octyl isocyanate, undecyl isocyanate, dodecyl isocyanate, tetradecyl isocyanate, cetyl isocyanate, stearyl isocyanate, cyclopentyl isocyanate, cyclohexyl isocyanate, 3- or 4-methylcyclohexyl isocyanate, phenyl isocyanate, alkylphenyl isocyanate, naphthyl isocyanate or any desired mixtures of such monoisocyanates. Examples of monomeric isocyanates having an isocyanate functionality of greater than two that may optionally be added to the polyisocyanate composition A include 4-isocyanatomethyloctane 1,8-diisocyanate (triisocyanatononane; TIN) or polycyclic derivatives of diphenylmethane diisocyanate (MDI), so-called polymeric MDI (pMDI) or crude MDI.

In one embodiment of the invention, the polyisocyanate composition A contains aromatic polyisocyanates. Preference is given to a content of aromatic polyisocyanates in the polyisocyanate composition A of not more than 70% by weight, especially not more than 30% by weight, not more than 20% by weight, not more than 10% by weight, not more than 5% by weight or not more than 1% by weight, based in each case on the weight of the polyisocyanate composition A, of aromatic polyisocyanates. As used here, "aromatic polyisocyanate" means a polyisocyanate having at least one aromatically bonded isocyanate group.

Aromatically bonded isocyanate groups are understood to mean isocyanate groups bonded to an aromatic hydrocarbyl radical.

In a preferred embodiment of the process according to the invention, a polyisocyanate composition A including aliphatically and/or cycloaliphatically bonded isocyanate groups to an extent of at least 80 mol %, more preferably at least 95 mol %, based on the total amount of the isocyanate groups present in the polyisocyanate composition A, is used. More preferably, the polyisocyanate composition A in this embodiment includes exclusively aliphatically and/or cycloaliphatically bonded isocyanate groups.

Aliphatically and cycloaliphatically bonded isocyanate groups are respectively understood to mean isocyanate groups bonded to an aliphatic and cycloaliphatic hydrocarbyl radical.

In another preferred embodiment of the process according to the invention, a polyisocyanate composition A consisting of or comprising one or more oligomeric polyisocyanates is used, where the one or more oligomeric polyisocyanates has/have exclusively aliphatically and/or cycloaliphatically bonded isocyanate groups.

In another preferred embodiment of the process according to the invention, a polyisocyanate composition A consisting of or comprising one or more monomeric polyisocyanates is used, where the one or more monomeric polyisocyanates has/have exclusively aliphatically and/or cycloaliphatically bonded isocyanate groups.

In a further embodiment of the invention, the polyisocyanate composition A consists to an extent of at least 70%, 80%, 85%, 90%, 95%, 98% or 99% by weight, based in each case on the weight of the polyisocyanate composition A, of monomeric and/or oligomeric polyisocyanates having exclusively aliphatically and/or cycloaliphatically bonded isocyanate groups. Practical experiments have shown that particularly good results can be achieved with polyisocyanate compositions A) in which the oligomeric polyisocyanates present therein have exclusively aliphatically and/or cycloaliphatically bonded isocyanate groups.

In a particularly preferred embodiment of the process according to the invention, a polyisocyanate composition A is used which consists of or comprises one or more oligomeric polyisocyanates, where the one or more oligomeric polyisocyanates is/are based on 1,4-diisocyanatobutane (BDI), 1,5-diisocyanatopentane (PDI), 1,6-diisocyanatohexane (HDI), isophorone diisocyanate (IPDI) or 4,4'-diisocyanatodicyclohexylmethane (H12MDI) or mixtures thereof.

In an alternative embodiment of the process according to the invention, a polyisocyanate composition A comprising one or more monomeric polyisocyanates selected from 1,4-diisocyanatobutane (BDI), 1,5-diisocyanatopentane (PDI), 1,6-diisocyanatohexane (HDI), isophorone diisocyanate (IPDI) or 4,4'-diisocyanatodicyclohexylmethane (H12MDI) or mixtures thereof is used.

Catalyst B1

Suitable catalysts B1 for the process according to the invention are in principle all compounds that, at low temperatures, catalyze crosslinking of isocyanate groups to uretdione, isocyanurate, allophanate, biuret, iminooxadiazinedione and/or oxadiazinetrione structures. This preferably takes place at not more than 100° C., preferably at not more than 60° C., more preferably at not more than 50° C. and most preferably at not more than 25° C. The temperature is based here on the actual temperature in the resin mixture and may be different than the ambient temperature in the individual case. A preferred catalyst B1 is a compound that catalyzes the formation of uretdione groups under the aforementioned conditions. Therefore, in a preferred embodiment, the catalytic polymerization forms uretdione groups at least to some degree. More preferably, catalyst B1 catalyzes predominantly the formation of uretdione groups, meaning that uretdione groups, based on the total number of groups formed within the catalytic polymerization overall, have at least the relative and more preferably the absolute majority.

Preference is given to catalysts B1 that enable a gradual reaction of isocyanate groups during the catalytic polymerization even at room temperature. A "gradual" reaction in the context of the invention is one in which the heat of reaction is dissipated to the environment at such a rate that the component or resin mixture does not exceed a temperature of 100° C., preferably 60° C. and more preferably 50° C. over a period of 30 min, preferably 60 min and more preferably 120 min. It will be apparent to the person skilled in the art that the control of the process can be optimized depending on the reactivity of the resin mixture and the volume/surface ratio of the component by adjusting the ambient temperature and the catalyst concentrations. The aim of the optimization is control of the reaction where the catalytic polymerization proceeds at maximum speed, but a resin temperature of 60° C., preferably 50° C., is not exceeded.

Particularly suitable catalysts B1 for the process according to the invention are phosphines of the general formula (I) or mixtures of such phosphines

in which
R1, R2 and R3 are identical or different radicals and are each an alkyl or cycloalkyl group having up to 10 carbon atoms, preferably an alkyl group having 2 to 8 carbon atoms or a cycloalkyl group having 3 to 8 carbon atoms, an aralkyl group having 7 to 10 and preferably 7 carbon atoms, or an aryl group which has 6 to 10 and preferably 6 carbon atoms and is optionally substituted by alkyl radicals having up to 10 and preferably 1 to 6 carbon atoms, with the proviso that not more than one of the radicals is an aryl group and at least one of the radicals is an alkyl or cycloalkyl group, or in which R1 and R2 are aliphatic in nature and, joined to one another, together with the phosphorus atom form a heterocyclic ring having 4 to 6 ring members, where R3 is an alkyl group having up to 4 carbon atoms.

Suitable tertiary organic phosphines are, for example, tertiary phosphines having linear aliphatic substituents, such as trimethylphosphine, triethylphosphine, tri-n-propylphosphine, tripropylphosphine, dibutylethylphosphine, tri-n-butylphosphine, triisobutylphosphine, tri-tert-butylphosphine, pentyldimethylphosphine, pentyldiethylphosphine, pentyldipropylphosphine, pentyldibutylphosphine, pentyldihexylphosphine, dipentylmethylphosphine, dipentylethylphosphine, dipentylpropylphosphine, dipentylbutylphosphine, dipentylhexylphosphine, dipentyloctylphosphine, tripentylphosphine, hexyldimethylphosphine, hexyldiethylphosphine, hexyldipropylphosphine, hexyldibutylphosphine, dihexylmethylphosphine, dihexylethylphosphine, dihexylpropylphosphine, dihexylbutylphosphine, trihexylphosphine, trioctylphosphine, tribenzylphosphine, benzyldimethylphosphine, dimethylphenylphosphine or butylphosphacyclopentane.

Further tertiary organic phosphines that are suitable for the process according to the invention are, for example, also the tertiary phosphines known from EP 1 422 223 A1 that have at least one cycloaliphatic radical bonded directly to phosphorus, for example cyclopentyldimethylphosphine, cyclopentyldiethylphosphine, cyclopentyldi-n-propylphosphine, cyclopentyldiisopropylphosphine, cyclopentyldibutylphosphines with any isomeric butyl radicals, cyclopentyldihexylphosphines with any isomeric hexyl radicals, cyclopentyldioctylphosphine with any isomeric octyl radicals, dicyclopentylmethylphosphine, dicyclopentylethylphosphine, dicyclopentyl-n-propylphosphine, dicyclopentylisopropylphosphine, dicyclopentylbutylphosphine with any isomeric butyl radical, dicyclopentylhexylphosphine with any isomeric hexyl radical, dicyclopentyloctylphosphine with any isomeric octyl radical, tricyclopentylphosphine, cyclohexyldimethylphosphine, cyclohexyldiethylphosphine, cyclohexyldi-n-propylphosphine, cyclohexyldiisopropylphosphine, cyclohexyldibutylphosphines with any isomeric butyl radicals, cyclohexyldihexylphosphine with any isomeric hexyl radicals, cyclohexyldioctylphosphine with any isomeric octyl radicals, dicyclohexylmethylphosphine, dicyclohexylethylphosphine, dicyclohexyl-n-propylphosphine, dicyclohexylisopropylphosphine, dicyclohexylbutylphosphine with any isomeric butyl radical, dicyclohexylhexylphosphine with any isomeric hexyl radical, dicyclohexyloctylphosphine with any isomeric octyl radical, and tricyclohexylphosphine.

Further suitable tertiary organic phosphines for the process according to the invention are, for example, also the tertiary phosphines that are known from EP 1 982 979 A1 and have one or two tertiary alkyl radicals bonded directly to phosphorus, for example tert-butyldimethylphosphine, tert-butyldiethylphosphine, tert-butyldi-n-propylphosphine, tert-butyldiisopropylphosphine, tert-butyldibutylphosphines with any isomeric butyl radicals for the non-tertiary butyl radicals, tert-butyldihexylphosphines with any isomeric hexyl radicals, but where not more than one of the hexyl radicals has a tertiary carbon atom bonded directly to phosphorus, tert-butyldioctylphosphines with any isomeric octyl radicals, but where not more than one of the octyl radicals has a tertiary carbon atom bonded directly to phosphorus, di-tert-butylmethylphosphine, di-tert-butylethylphosphine, di-tert-butyl-n-propylphosphine, di-tert-butylisopropylphosphine, di-tert-butylbutylphosphines in which the non-tertiary butyl radical may be n-butyl, isobutyl, 2-butyl or cyclobutyl, di-tert-butylhexylphosphines with any isomeric hexyl radical having no tertiary carbon atom bonded directly to phosphorus, di-tert-butyloctylphosphines with any isomeric octyl radical having no tertiary carbon atom bonded directly to phosphorus, tert-amyldimethylphosphine, tert-amyldiethylphosphine, tert-amyldi-n-propylphosphine, tert-amyldiisopropylphosphine, tert-amyldibutylphosphines with any isomeric butyl radicals, but where not more than one of the butyl radicals is tert-butyl, tert-amyldihexylphosphines with any isomeric hexyl radicals, but where not more than one of the hexyl radicals has a tertiary carbon atom bonded directly to phosphorus, tert-amyldioctylphosphines with any isomeric octyl radicals, but where not more than one of the octyl radicals has a tertiary carbon atom bonded directly to phosphorus, di-tert-amylethylphosphine, di-tert-amylethylphosphine, di-tert-amyl-n-propylphosphine, di-tert-amylisopropylphosphine, di-tert-amylbutylphosphines in which the butyl radical may be n-butyl, isobutyl, 2-butyl or cyclobutyl, di-tert-amylhexylphosphines with any isomeric hexyl radical having no tertiary carbon atom bonded directly to phosphorus, di-tert-amyloctylphosphines with any isomeric octyl radical having no tertiary carbon atom bonded directly to phosphorus, adamantyldimethylphosphine, adamantyldiethylphosphine, adamantyldi-n-propylphosphine, adamantyldiisopropylphosphine, adamantyldibutylphosphines with any isomeric butyl radicals, but where not more than one of the butyl radicals has a tertiary carbon atom bonded directly to phosphorus, adamantyldihexylphosphines with any isomeric hexyl radicals, but where not more than one of the hexyl radicals has a tertiary carbon atom bonded directly to phosphorus, adamantyldioctylphosphines with any isomeric octyl radicals, but where not more than one of the octyl radicals has a tertiary carbon atom bonded directly to phosphorus, diadamantylmethylphosphine, diadamantylethylphosphine, diadamantyl-n-propylphosphine, diadamantylisopropylphosphine, diadamantylbutylphosphines in which the butyl radical may be n-butyl, isobutyl, 2-butyl or cyclobutyl, diadamantylhexylphosphines with any isomeric hexyl radical having no tertiary carbon atom bonded directly to phosphorus, and diadamantyloctylphosphines with any isomeric hexyl radical having no tertiary carbon atom bonded directly to phosphorus.

Preferably, in the process according to the invention, catalyst B1 contains at least one compound from the group of the tertiary phosphines having linear aliphatic substituents mentioned.

Very particularly preferred catalysts B1 contain tri-n-butylphosphine and/or trioctylphosphine or mixtures thereof.

In the process according to the invention, the catalyst B1 is generally used in a concentration based on the weight of the polyisocyanate composition A used of 0.005% to 10.0% by weight, preferably of 0.010% to 5.0% by weight and more preferably of 0.1% to 3.0% by weight.

Catalyst B2

Suitable catalysts B2 for the process according to the invention are in principle all compounds that bring about rapid trimerization of isocyanate groups and uretdione groups to isocyanurate structures at high temperatures of at least 100° C., preferably of at least 120° C., more preferably of at least 140° C. and most preferably of at least 160° C.

"Rapid" means here that the trimerization in the final curing step is largely complete within a period of not more than 24 hours, preferably not more than 12 hours and more preferably not more than 60 minutes and most preferably not more than 30 minutes. The trimerization reaction is largely complete when only at most 40 mol %, more preferably at most 20 mol % and most preferably at most 5 mol % of the sum total of reactive groups, corresponding to the sum total of isocyanate and uretdione groups, originally present in the polyisocyanurate polymer C, is present. Preference is given to using catalysts B2 for which, in a "rapid trimerization" for the purposes of the present application, at most 20 mol % of the isocyanate groups originally present in the polyisocyanate composition A is still present after not more than 6 hours at a temperature of at least 120° C. The amount of residual isocyanate groups is preferably measured by means of ATR spectroscopy by the peak maximum of the isocyanate absorption peak versus the starting composition A, normalized against the CH vibrations at 2700-3100 cm$^{-1}$.

The trimerization reaction can optionally also be measured by means of monitoring of the Tg value. The trimerization reaction is largely complete when the Tg of the component, in the event of an increase in the crosslinking temperature by 20° C., increases by at most 15° C., more preferably at most 10° C. and most preferably at most 5° C. after 60 minutes.

Suitable catalysts B2 are especially those that show essentially no activity, compared to catalyst B1, under the reaction conditions, i.e. temperature and time, used for the catalytic polymerization. What is meant here by "essentially no activity" is that catalyst B2, under the reaction conditions that exist here, compared to B1, has a reaction rate coefficient of the conversion of isocyanate groups $k(T)_{ISOB2}$ which is smaller at least by a factor of 2, preferably a factor of 3, more preferably a factor of 4, than the reaction rate coefficient $k(T)_{ISOB1}$. The "conversion of isocyanate groups" relates to the reaction of isocyanate groups to form at least one structure selected from the group consisting of urethane, urea, uretdione, isocyanurate, allophanate, biuret, iminooxadiazinedione and oxadiazinetrione structures.

Reaction rate coefficients can be ascertained by commonly known methods from the conversion rate of the isocyanate group at the desired reaction temperatures, optionally individually in solution. For this purpose, the reaction is observed by means of IR or NIR or NMR within a range up to max. 10% conversion, and the decrease in the isocyanate concentration is plotted against time at a given temperature.

Suitable catalysts B2 for the process according to the invention are, for example, simple tertiary amines, for example triethylamine, tributylamine, N,N-dimethylaniline, N-ethylpiperidine or N,N'-dimethylpiperazine. Suitable catalysts also include the tertiary hydroxyalkylamines described in GB 2 221 465, for example triethanolamine, N-methyldiethanolamine, dimethylethanolamine, N-isopropyldiethanolamine and 1-(2-hydroxyethyl)pyrrolidine or the catalyst systems known from GB 2 222 161 that consist of mixtures of tertiary bicyclic amines, for example DBU, with simple aliphatic alcohols of low molecular weight.

Likewise suitable as trimerization catalysts B2 for the process according to the invention are a multitude of different metal compounds. Suitable examples are the octoates and naphthenates of manganese, iron, cobalt, nickel, copper, zinc, zirconium, cerium or lead or mixtures thereof with acetates of lithium, sodium, potassium, calcium or barium that are described as catalysts in DE-A 3 240 613, the sodium and potassium salts of linear or branched alkanecarboxylic acids having up to 10 carbon atoms that are disclosed by DE-A 3 219 608, such as of propionic acid, butyric acid, valeric acid, caproic acid, heptanoic acid, caprylic acid, pelargonic acid, capric acid and undecyl acid, the alkali metal or alkaline earth metal salts of aliphatic, cycloaliphatic or aromatic mono- and polycarboxylic acids having 2 to 20 carbon atoms that are disclosed by EP-A 0 100 129, such as sodium benzoate or potassium benzoate, the alkali metal phenoxides disclosed by GB-B 1 391 066 and GB-B 1 386 399, such as sodium phenoxide or potassium phenoxide, the alkali metal and alkaline earth metal oxides, hydroxides, carbonates, alkoxides and phenoxides disclosed by GB 809 809, alkali metal salts of enolizable compounds and metal salts of weak aliphatic or cycloaliphatic carboxylic acids such as sodium methoxide, sodium acetate, potassium acetate, sodium acetoacetate, lead 2-ethylhexanoate, and lead naphthenate, the basic alkali metal compounds complexed with crown ethers or polyether alcohols that are disclosed by EP-A 0 056 158 and EP-A 0 056 159, such as complexed sodium carboxylates or potassium carboxylates, the pyrrolidinone potassium salt disclosed by EP-A 0 033 581, the mono- or polynuclear complex of titanium, zirconium and/or hafnium disclosed by application EP 13196508.9, such as zirconium tetra-n-butoxide, zirconium tetra-2-ethylhexanoate and zirconium tetra-2-ethylhexoxide, and tin compounds of the type described in *European Polymer Journal*, vol. 16, 147-148 (1979), such as dibutyltin dichloride, diphenyltin dichloride, triphenylstannanol, tributyltin acetate, tributyltin oxide, tin octoate, dibutyl (dimethoxy)stannane, and tributyltin imidazolate.

Further trimerization catalysts B2 suitable for the process according to the invention are, for example, the quaternary ammonium hydroxides known from DE-A 1 667 309, EP-A 0 013 880 and EP-A 0 047 452, for example tetraethylammonium hydroxide, trimethylbenzylammonium hydroxide, N,N-dimethyl-N-dodecyl-N-(2-hydroxyethyl)ammonium hydroxide, N-(2-hydroxyethyl)-N,N-dimethyl-N-(2,2'-dihydroxymethylbutyl)ammonium hydroxide and 1-(2-hydroxyethyl)-1,4-diazabicyclo[2.2.2]octane hydroxide (monoadduct of ethylene oxide and water onto 1,4-diazabicyclo[2.2.2]octane), the quaternary hydroxyalkylammonium hydroxides known from EP-A 37 65 or EP-A 10 589, for example N,N,N-trimethyl-N-(2-hydroxyethyl)ammonium hydroxide, the trialkylhydroxyalkylammonium carboxylates that are known from DE-A 2631733, EP-A 0 671 426, EP-A 1 599 526 and U.S. Pat. No. 4,789,705, for example N,N,N-trimethyl-N-2-hydroxypropylammonium p-tert-butylbenzoate and N,N,N-trimethyl-N-2-hydroxypropylammonium 2-ethylhexanoate, the quaternary benzylammonium carboxylates known from EP-A 1 229 016, for example N-benzyl-N,N-dimethyl-N-ethylammonium pivalate, N-benzyl-N,N-dimethyl-N-ethylammonium 2-ethylhexanoate, N-benzyl-N,N,N-tributylammonium 2-ethylhexanoate, N,N-dimethyl-N-ethyl-N-(4-methoxybenzyl)ammonium 2-ethylhexanoate or N,N,N-tributyl-N-(4-methoxybenzyl)ammonium pivalate, the tetrasubstituted ammonium α-hydroxycarboxylates known from WO 2005/087828, for example tetramethylammonium lactate, the quaternary ammonium or phosphonium fluorides known from EP-A 0 339 396, EP-A 0 379 914 and EP-A 0 443 167, for example N-methyl-N,N,N-trialkylammonium fluorides with $C_8$-$C_{10}$-alkyl radicals, N,N,N,N-tetra-n-butylammonium fluoride, N,N,N-trimethyl-N-benzylammonium fluoride, tetramethylphosphonium fluoride, tetraethylphosphonium fluoride or tetra-n-butylphosphonium fluoride, the quaternary ammonium and phosphonium polyfluorides known from EP-A 0 798 299, EP-A 0 896 009 and EP-A 0 962 455, for example benzyltrimethylammonium hydrogen polyfluoride, the tetraalkylammonium alkylcarbonates which are known from EP-A 0 668 271 and are obtainable by reaction of tertiary amines with dialkyl carbonates, or betaine-structured quaternary ammonioalkyl carbonates, the quaternary ammonium hydrogencarbonates known from WO 1999/023128, for example choline bicarbonate, the quaternary ammonium salts which are known from EP 0 102 482 and are obtainable from tertiary amines and alkylating esters of phosphorus acids, examples of such salts being reaction products of triethylamine, DABCO or N-methylmorpholine with dimethyl methanephosphonate, or the tetrasubstituted ammonium salts of lactams that are known from WO 2013/167404, for example trioctylammonium caprolactamate or dodecyltrimethylammonium caprolactamate.

Further trimerization catalysts B2 suitable for the process according to the invention can be found, for example, in J. H. Saunders and K. C. Frisch, Polyurethanes Chemistry and Technology, p. 94 ff. (1962) and the literature cited therein.

The catalysts B2 may be used in the process according to the invention either individually or in the form of any desired mixtures with one another.

Preferred catalysts B2 are metal compounds of the aforementioned type, especially carboxylates and alkoxides of alkali metals, alkaline earth metals, tin or zirconium, and organic tin compounds of the type mentioned.

Particularly preferred trimerization catalysts B2 are tin, sodium and potassium salts of aliphatic carboxylic acids having 2 to 20 carbon atoms.

Very particularly preferred trimerization catalysts B2 for the process according to the invention are potassium acetate and tin octoate.

"Catalyst" in the context of the invention is understood to mean the combination of active substance and suitable solvents, coactivators, reactive diluents, as employed in the examples.

In the process according to the invention, the trimerization catalyst B2 is generally used in a concentration based on the amount of the polyisocyanate composition A used of 0.0005% to 15.0% by weight, preferably of 0.010% to 10.0% by weight and more preferably of 0.1% to 5.0% by weight.

In a preferred embodiment of the invention, the catalyst B2 used is at least one basic compound, especially salts of carboxylic acids. More particularly, it is also possible to use mixtures of various basic compounds as catalyst B2.

In a further preferred embodiment of the invention, the catalyst B2 used is at least one basic compound of the alkali metals or alkaline earth metals, especially their salts of carboxylic acids such as potassium acetate, and a polyether. The polyether has at least 2, preferably at least 4, more preferably at least 6 and especially at least 8 successive ethylene oxide units in the molecule.

In a particularly preferred embodiments of the present invention, the catalyst B2 is a polyether having at least 2, preferably 4 and more preferably at least 6 successive ethylene oxide units in the molecule. Dissolved in this polyether is an alkaline potassium, lithium or sodium salt with a metal ion concentration between 0.01% by weight and 50% by weight, preferably between 0.1% by weight and 25% by weight, more preferably between 0.5% by weight and 15% by weight, and especially between 1% by weight and 10% by weight. Most preferred is a polyether having at least 7 successive ethylene oxide units in the molecule, in which at least a portion of the alkaline potassium salt is dissolved.

In the process according to the invention, the trimerization catalyst B2, when basic salts of carboxylic acids are used, is generally used in a concentration based on the amount of the polyisocyanate composition A) used of 0.04% to 15.0% by weight, preferably of 0.10% to 8.0% by weight and more preferably of 0.5% to 5.0% by weight. To calculate the concentration, the trimerization catalyst B2 is considered here merely to be the mixture of the at least one basic compound.

The catalysts B1 and B2 that are used in the process according to the invention generally have sufficient solubility or dispersibility in the polyisocyanate composition A in the amounts that are required for initiation of the crosslinking reaction. The catalysts B1 and B2 are therefore preferably added to the polyisocyanate composition A in neat form.

Optionally, however, the catalysts B1 and B2 can also be used dissolved in a suitable organic solvent to improve their incorporability. Suitable solvents are all those that do not adversely affect the activity of catalysts B1 and B2 under the chosen reaction conditions, and especially do not enter into any chemical reactions with the catalysts B1 and B2 by which they are deactivated or "poisoned". The degree of dilution of the catalyst solutions can be chosen freely within a very wide range.

Suitable catalyst solvents are, for example, solvents that are inert toward isocyanate groups, for example hexane, toluene, xylene, chlorobenzene, ethyl acetate, butyl acetate, diethylene glycol dimethyl ether, dipropylene glycol dimethyl ether, ethylene glycol monomethyl or monoethyl ether acetate, diethylene glycol ethyl and butyl ether acetate, propylene glycol monomethyl ether acetate, 1-methoxy-2-propyl acetate, 3-methoxy-n-butyl acetate, propylene glycol diacetate, acetone, methyl ethyl ketone, methyl isobutyl ketone, cyclohexanone, lactones, such as β-propiolactone, γ-butyrolactone, ε-caprolactone and ε-methylcaprolactone, but also solvents such as N-methylpyrrolidone and N-methylcaprolactam, 1,2-propylene carbonate, methylene chloride, dimethyl sulfoxide, triethyl phosphate or any desired mixtures of such solvents.

If catalyst solvents are used in the process according to the invention, preference is given to using catalyst solvents which bear groups reactive toward isocyanates and can be incorporated into the polyisocyanurate plastic. Examples of such solvents are mono- or polyhydric simple alcohols, for example methanol, ethanol, n-propanol, isopropanol, n-butanol, n-hexanol, 2-ethyl-1-hexanol, ethylene glycol, propylene glycol, the isomeric butanediols, 2-ethylhexane-1,3-diol or glycerol; ether alcohols, for example 1-methoxy-2-propanol, 3-ethyl-3-hydroxymethyloxetane, tetrahydrofurfuryl alcohol, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, diethylene glycol, dipropylene glycol or else liquid higher molecular weight polyethylene glycols, polypropylene glycols, mixed polyethylene/polypropylene glycols and the monoalkyl ethers thereof; ester alcohols, for example ethylene glycol monoacetate, propylene glycol monolaurate, glycerol mono- and diacetate, glycerol monobutyrate or 2,2,4-trimethylpentane-1,3-diol monoisobutyrate; unsaturated alcohols, for example allyl alcohol, 1,1-dimethylallyl alcohol or oleyl alcohol; araliphatic alcohols, for example benzyl alcohol; N-monosubstituted amides, for example N-methylformamide, N-methylacetamide, cyanoacetamide or 2-pyrrolidinone, or any desired mixtures of such solvents.

It has further been found that compounds of the formula (II) below are of particularly good suitability as catalysts B2

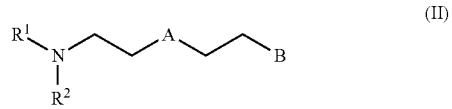

(II)

where $R^1$ and $R^2$ are independently selected from the group consisting of hydrogen, methyl, ethyl, propyl, isopropyl, butyl, isobutyl, branched C5-alkyl, unbranched C5-alkyl, branched C6-alkyl, unbranched C6-alkyl, branched C7-alkyl and unbranched C7-alkyl;

A is selected from the group consisting of O, S and $NR^3$ where $R^3$ is selected from the group consisting of hydrogen, methyl, ethyl, propyl, isopropyl, butyl and isobutyl; and B is selected independently of A from the group consisting of OH, SH, $NHR^4$ and $NH_2$, where $R^4$ is selected from the group consisting of methyl, ethyl and propyl;

In a preferred embodiment, A is $NR^3$ where $R^3$ is selected from the group consisting of hydrogen, methyl, ethyl, propyl, isopropyl, butyl and isobutyl. $R^3$ is preferably methyl or ethyl. $R^3$ is more preferably methyl.

In a first variant of this embodiment, B is OH and $R^1$ and $R^2$ are independently selected from the group consisting of hydrogen, methyl, ethyl, propyl, isopropyl, butyl, isobutyl, branched C5-alkyl, unbranched C5-alkyl, branched C6-alkyl, unbranched C6-alkyl, branched C7-alkyl and unbranched C7-alkyl. $R^1$ and $R^2$ are preferably independently methyl or ethyl. $R^1$ and $R^2$ are more preferably methyl.

In a second variant of this embodiment, B is SH and $R^1$ and $R^2$ are independently selected from the group consisting of hydrogen, methyl, ethyl, propyl, isopropyl, butyl, isobutyl, branched C5-alkyl, unbranched C5-alkyl, branched C6-alkyl, unbranched C6-alkyl, branched C7-alkyl and unbranched C7-alkyl. $R^1$ and $R^2$ are preferably independently methyl or ethyl. $R^1$ and $R^2$ are more preferably methyl.

In a third variant of this embodiment, B is $NHR^4$ and $R^1$ and $R^2$ are independently selected from the group consisting of hydrogen, methyl, ethyl, propyl, isopropyl, butyl, isobutyl, branched C5-alkyl, unbranched C5-alkyl, branched C6-alkyl, unbranched C6-alkyl, branched C7-alkyl and unbranched C7-alkyl. $R^1$ and $R^2$ are preferably independently methyl or ethyl. $R^1$ and $R^2$ are more preferably methyl. In this variant, R4 is selected from the group consisting of methyl, ethyl and propyl. Preferably, R4 is methyl or ethyl. R4 is more preferably methyl.

In a fourth variant of this embodiment, B is $NH_2$ and $R^1$ and $R^2$ are independently selected from the group consisting of hydrogen, methyl, ethyl, propyl, isopropyl, butyl, isobutyl, branched C5-alkyl, unbranched C5-alkyl, branched C6-alkyl, unbranched C6-alkyl, branched C7-alkyl and unbranched C7-alkyl. $R^1$ and $R^2$ are preferably independently methyl or ethyl. $R^1$ and $R^2$ are more preferably methyl.

In a further preferred embodiment, A is oxygen.

In a first variant of this embodiment, B is OH and $R^1$ and $R^2$ are independently selected from the group consisting of hydrogen, methyl, ethyl, propyl, isopropyl, butyl, isobutyl, branched C5-alkyl, unbranched C5-alkyl, branched C6-alkyl, unbranched C6-alkyl, branched C7-alkyl and unbranched C7-alkyl. $R^1$ and $R^2$ are preferably independently methyl or ethyl. $R^1$ and $R^2$ are more preferably methyl.

In a second variant of this embodiment, B is SH and $R^1$ and $R^2$ are independently selected from the group consisting of hydrogen, methyl, ethyl, propyl, isopropyl, butyl, isobutyl, branched C5-alkyl, unbranched C5-alkyl, branched C6-alkyl, unbranched C6-alkyl, branched C7-alkyl and unbranched C7-alkyl. $R^1$ and $R^2$ are preferably independently methyl or ethyl. $R^1$ and $R^2$ are more preferably methyl.

In a third variant of this embodiment, B is $NHR^4$ and $R^1$ and $R^2$ are independently selected from the group consisting of hydrogen, methyl, ethyl, propyl, isopropyl, butyl, isobutyl, branched C5-alkyl, unbranched C5-alkyl, branched C6-alkyl, unbranched C6-alkyl, branched C7-alkyl and unbranched C7-alkyl. $R^1$ and $R^2$ are preferably independently methyl or ethyl. $R^1$ and $R^2$ are more preferably methyl. In this variant, $R^4$ is selected from the group consisting of methyl, ethyl and propyl. Preferably, R4 is methyl or ethyl. R4 is more preferably methyl.

In a fourth variant of this embodiment, B is $NH_2$ and $R^1$ and $R^2$ are independently selected from the group consisting of hydrogen, methyl, ethyl, propyl, isopropyl, butyl, isobutyl, branched C5-alkyl, unbranched C5-alkyl, branched C6-alkyl, unbranched C6-alkyl, branched C7-alkyl and unbranched C7-alkyl. $R^1$ and $R^2$ are preferably independently methyl or ethyl. $R^1$ and $R^2$ are more preferably methyl.

In yet a further preferred embodiment, A is sulfur.

In a first variant of this embodiment, B is OH and $R^1$ and $R^2$ are independently selected from the group consisting of hydrogen, methyl, ethyl, propyl, isopropyl, butyl, isobutyl, branched C5-alkyl, unbranched C5-alkyl, branched C6-alkyl, unbranched C6-alkyl, branched C7-alkyl and unbranched C7-alkyl. $R^1$ and $R^2$ are preferably independently methyl or ethyl. $R^1$ and $R^2$ are more preferably methyl.

In a second variant of this embodiment, B is SH and $R^1$ and $R^2$ are independently selected from the group consisting of hydrogen, methyl, ethyl, propyl, isopropyl, butyl, isobutyl, branched C5-alkyl, unbranched C5-alkyl, branched C6-alkyl, unbranched C6-alkyl, branched C7-alkyl and unbranched C7-alkyl. $R^1$ and $R^2$ are preferably independently methyl or ethyl. $R^1$ and $R^2$ are more preferably methyl.

In a third variant of this embodiment, B is $NHR^4$ and $R^1$ and $R^2$ are independently selected from the group consisting of hydrogen, methyl, ethyl, propyl, butyl, isobutyl, branched C5-alkyl, unbranched C5-alkyl, branched C6-alkyl, unbranched C6-alkyl, branched C7-alkyl and unbranched C7-alkyl. $R^1$ and $R^2$ are preferably independently methyl or ethyl. $R^1$ and $R^2$ are more preferably methyl. In this variant, $R^4$ is selected from the group consisting of methyl, ethyl and propyl. Preferably, R4 is methyl or ethyl. R4 is more preferably methyl.

In a fourth variant of this embodiment, B is $NH_2$ and $R^1$ and $R^2$ are independently selected from the group consisting of hydrogen, methyl, ethyl, propyl, isopropyl, butyl, isobutyl, branched C5-alkyl, unbranched C5-alkyl, branched C6-alkyl, unbranched C6-alkyl, branched C7-alkyl and unbranched C7-alkyl. $R^1$ and $R^2$ are preferably independently methyl or ethyl. $R^1$ and $R^2$ are more preferably methyl.

Also suitable are adducts of a compound of formula (II) and a compound having at least one isocyanate group.

The umbrella term "adduct" is understood to mean urethane, thiourethane and urea adducts of a compound of formula (II) with a compound having at least one isocyanate group. A urethane adduct is particularly preferred. The adducts according to the invention are formed when an isocyanate reacts with the functional group B of the compound defined in formula (II). When B is a hydroxyl group a urethane adduct is formed. When B is a thiol group a thiourethane adduct is formed. And when B is $NH_2$ or $NHR^4$ a urea adduct is formed.

Additives E

The polyisocyanurate plastics D obtainable by the process according to the invention, even as they are, i.e. without addition of appropriate auxiliaries and additions E, are notable for very good light stability, especially when an aliphatic polyisocyanate composition A is used. Nevertheless, it is optionally also possible to use standard auxiliaries and additions E in the production thereof, for example standard fillers, UV stabilizers, antioxidants, mold release agents, water scavengers, slip additives, defoamers, leveling agents, rheology additives, flame retardants and/or pigments. These auxiliaries and additions E, excluding fillers and flame retardants, are typically present in the polyisocyanurate plastic D in an amount of less than 10% by weight, preferably less than 5% by weight, more preferably up to 3% by weight, based on the polyisocyanate composition A. Flame retardants are typically present in the polyisocyanurate plastic in amounts of not more than 70% by weight, preferably not more than 50% by weight and more preferably not more than 30% by weight, calculated as the total amount of flame retardants used, based on the polyisocyanate composition A.

Suitable fillers $E_w$ are, for example, $Al(OH)_3$, $CaCO_3$, metal pigments such as $TiO_2$ and further known standard fillers. These fillers $E_w$ are preferably used in amounts of not more than 95% by weight, preferably not more than 80% by weight, more preferably not more than 50% by weight, calculated as the total amount of fillers used, based on the polyisocyanate composition A.

Suitable UV stabilizers $E_x$ may preferably be selected from the group consisting of piperidine derivatives, for example 4-benzoyloxy-2,2,6,6-tetramethylpiperidine, 4-benzoyloxy-1,2,2,6,6-pentamethylpiperidine, bis(2,2,6,6-tetramethyl-4-piperidyl) sebacate, bis(1,2,2,6,6-pentamethyl-1-4-piperidinyl) sebacate, bis(2,2,6,6-tetramethyl-4-piperidyl) suberate, bis(2,2,6,6-tetramethyl-4-piperidyl) dodecanedioate; benzophenone derivatives, for example 2,4-dihydroxy-, 2-hydroxy-4-methoxy-, 2-hydroxy-4-octoxy-, 2-hydroxy-4-dodecyloxy- or 2,2'-dihydroxy-4-dodecyloxybenzophenone; benzotriazole derivatives, for example 2-(2H-benzotriazol-2-yl)-4,6-di-tert-pentylphenol, 2-(2H-benzotriazol-2-yl)-6-dodecyl-4-methylphenol, 2-(2H-benzotriazol-2-yl)-4,6-bis(1-methyl-1-phenylethyl) phenol, 2-(5-chloro-2H-benzotriazol-2-yl)-6-(1,1-dimethylethyl)-4-methylphenol, 2-(2H-benzotriazol-2-yl)-4-(1,1,3,3-tetramethylbutyl)phenol, 2-(2H-benzotriazol-2-yl)-6-(1-methyl-1-phenylethyl)-4-(1,1,3,3-tetramethylbutyl)phenol, isooctyl 3-(3-(2H-benzotriazol-2-yl)-5-(1,1-dimethylethyl)-4-hydroxyphenylpropionate), 2-(2H-benzotriazol-2-yl)-4,6-bis(1,1-dimethylethyl)phenol, 2-(2H-benzotriazol-2-yl)-4,6-bis(1-methyl-1-phenylethyl)phenol, 2-(5-chloro-2H-benzotriazol-2-yl)-4,6-bis(1,1-dimethylethyl)phenol; oxalanilides, for example 2-ethyl-2'-ethoxy- or 4-methyl-4'-methoxyoxalanilide; salicylic esters, for example phenyl salicylate, 4-tert-butylphenyl salicylate, 4-tert-octylphenyl salicylate; cinnamic ester derivatives, for example methyl α-cyano-β-methyl-4-methoxycinnamate, butyl α-cyano-β-methyl-4-methoxycinnamate, ethyl α-cyano-β-phenylcinnamate, isooctyl α-cyano-β-phenylcinnamate; and malonic ester derivatives, such as dimethyl 4-methoxybenzylidenemalonate, diethyl 4-methoxybenzylidenemalonate, dimethyl 4 butoxybenzylidenemalonate. These preferred light stabilizers may be used either individually or in any desired combinations with one another.

Particularly preferred UV stabilizers $E_x$ for the polyisocyanurate plastics D producible according to the invention are those that fully absorb radiation of wavelength <400 nm. These include, for example, the benzotriazole derivatives mentioned. Especially preferred UV stabilizers are 2-(5-chloro-2H-benzotriazol-2-yl)-6-(1,1-dimethylethyl)-4-methylphenol, 2-(2H-benzotriazol-2-yl)-4-(1,1,3,3-tetramethylbutyl)phenol, and/or 2-(5-chloro-2H-benzotriazol-2-yl)-4,6-bis(1,1-dimethylethyl)phenol.

One or more of the UV stabilizers $E_x$ mentioned by way of example are optionally added to the polyisocyanate composition A, preferably in amounts of 0.001% to 3.0% by weight, more preferably 0.01% to 2% by weight, calculated as the total amount of UV stabilizers used, based on the total weight of the polyisocyanate composition A.

Suitable antioxidants $E_y$ are preferably sterically hindered phenols, which may be selected preferably from the group consisting of 2,6-di-tert-butyl-4-methylphenol (ionol), pentaerythritol tetrakis(3-(3,5-di-tert-butyl-4-hydroxyphenyl) propionate), octadecyl 3-(3,5-di-tert-butyl-4-hydroxyphenyl)propionate, triethylene glycol bis(3-tert-butyl-4-hydroxy-5-methylphenyl)propionate, 2,2'-thio bis(4-methyl-6-tert-butylphenol) and 2,2'-thiodiethyl bis[3-(3,5-di-tert-butyl-4-hydroxyphenyl)propionate]. These may be used either individually or in any desired combinations with one another as required.

These antioxidants $E_y$ are preferably used in amounts of 0.01% to 3.0% by weight, more preferably 0.02% to 2.0% by weight, calculated as the total amount of antioxidants used, based on the polyisocyanate composition A.

Apart from the small amounts of any catalyst solvents to be used, the process according to the invention can be performed in a solvent-free manner. Especially in the case of the use according to the invention for production of coatings or films, the polyisocyanate composition A may optionally also be diluted with organic solvents to reduce the processing viscosity, however. Solvents suitable for this purpose are, for example, the catalyst solvents inert toward isocyanate groups that have already been described above.

In the case of the use according to the invention for production of films, semifinished products or moldings it is finally also possible to add internal mold release agents $E_z$ as further auxiliaries and additions E.

These are preferably the nonionic surfactants that contain perfluoroalkyl or polysiloxane units and are known as mold release agents, quaternary alkyl ammonium salts, for example trimethylethylammonium chloride, trimethylstearylammonium chloride, dimethylethylcetylammonium chloride, triethyldodecylammonium chloride, trioctylmethylammonium chloride and diethylcyclohexyldodecylammonium chloride, acidic mono- and dialkyl phosphates having 2 to 18 carbon atoms in the alkyl radical, for example ethyl phosphate, diethyl phosphate, isopropyl phosphate, diisopropyl phosphate, butyl phosphate, dibutyl phosphate, octyl phosphate, dioctyl phosphate, isodecyl phosphate, diisodecyl phosphate, dodecyl phosphate, didodecyl phosphate, tridecanol phosphate, bis(tridecanol) phosphate, stearyl phosphate, distearyl phosphate, and any desired mixtures of such mold release agents.

Particularly preferred mold release agents $E_z$ are the acidic mono- and dialkyl phosphates mentioned, most preferably those having 8 to 12 carbon atoms in the alkyl radical.

Internal mold release agents $E_z$ are optionally used in the process according to the invention, preferably in amounts of 0.01% to 3.0% by weight, more preferably 0.02% to 2.0% by weight, calculated as the total amount of internal mold release agent used, based on the polyisocyanate composition A.

In the preparation of a polyisocyanate polymer C, in the first step, a mixture of the polyisocyanate composition A described, a catalyst B1 and a catalyst B2 is provided. It is possible here to add catalysts B1 and B2 or a mixture of different catalysts B1 and a mixture of different trimerization catalysts B2 to the polyisocyanate composition A, optionally under reduced pressure or under inert gas, for example nitrogen, and optionally with additional use of the aforementioned solvents and auxiliaries and additions, and to mix them in homogeneously with the aid of a suitable mixing unit. The addition of catalyst B1 and B2 and any solvent and auxiliaries and additions E to be used may take place in any sequence, successively or in a mixture, in the above-specified amounts, generally at a temperature of −40° C. to 100° C., preferably of 0° C. to 80° C., more preferably of 10° C. to 60° C.

The catalyzed reaction mixtures thus obtained, according to the end use, can be applied by different methods that are known per se. For production of films or coatings, for example lacquers, a mixture of catalyst B1, catalyst B2 and polyisocyanate composition A may be applied, for example by spraying, painting, dipping, flow-coating, printing, doctor blading, rolling, in one or more layers to any substrates, for example metal, wood, glass, stone, ceramic materials, concrete, hard and flexible plastics, textiles, leather and paper, and these can optionally also be provided with standard primers prior to the coating.

For production of solid bodies, for example semifinished products or moldings, the mixture of catalyst B1, catalyst B2 and polyisocyanate composition A can be introduced into open or closed molds, for example, by simple manual pouring, or with the aid of suitable machinery, for example the low-pressure or high-pressure machinery which is standard in polyurethane technology.

Catalytic Crosslinking

In the present application, a distinction is made between a "catalytic polymerization" and a "catalytic trimerization". Catalytic polymerization is effected at a temperature of not more than 100° C. and is preferably catalyzed by presence of catalyst B1. The result of the "catalytic polymerization"

is the polyisocyanate polymer C which has the feature that preferably at least 5% by weight, preferably at least 10% by weight, more preferably at least 20% by weight and most preferably at least 30% by weight of the isocyanates present in the polyisocyanate composition A have been converted to uretdione groups.

This is distinct from catalytic trimerization, which is performed in a further process step that follows the catalytic polymerization, at a temperature above the catalytic polymerization temperature.

Catalytic trimerization is conducted at a temperature at least 20° C., preferably at least 40° C. and more preferably at least 60° C. higher than the temperature at which the catalytic polymerization is conducted.

The catalytic polymerization of the polyisocyanate composition A to give a polyisocyanate polymer C typically commences with addition of the catalyst. The reaction rate and selectivity of the conversion to uretdione groups can optionally be controlled by heating the polyisocyanate composition A or the coated substrates or filled molds, in which case the optimal average reaction temperature is from −20° C. to 100° C., preferably from 0 to 60° C., more preferably from 5 to 30° C.

In a preferred embodiment of the process according to the invention, relatively gradual crosslinking during the catalytic polymerization is preferred in order to enable good dissipation of heat to the environment and prevent overheating of the product or the activation of catalyst B2. The catalytic polymerization is therefore effected over a period of at least 6 hours up to 14 days until it is "largely complete" as defined below.

Since the aim of the catalytic polymerization is the preparation of a transportable isocyanate polymer C, the catalytic polymerization is preferably conducted up to a point at which the resultant isocyanate polymer C has a modulus G' determined by a plate/plate rheometer to ISO 6721-10:2015-09 at a frequency of 1/s at 23° C. of at least $1*10^6$ Pa, preferably $5*10^6$ Pa and more preferably $1*10^7$ Pa. At this point, the polyisocyanate polymer C is "dry" for the purposes of this application.

The progression of the reaction can initially still be monitored by titrimetric determination of the NCO content, but gelation and solidification of the reaction mixture sets in rapidly as the reaction progresses, which makes wet-chemical analysis methods impossible. The further conversion of isocyanate groups can then be monitored only by spectroscopic methods, for example by ATR spectroscopy with reference to the intensity of the isocyanate band at about 2270 $cm^{-1}$.

The catalytic polymerization or catalytic trimerization is considered to be complete especially when, within a period of at least 3 hours, the height of the peak maximum of at least one functional group from the list of isocyanate, isocyanurate and uretdione changes by not more than 5%, determined by means of attenuated total reflection infrared spectroscopy (ATR) versus the starting composition A or C.

In a preferred embodiment of the process according to the invention, the catalytic polymerization is "largely complete" when the polyisocyanate composition A has reached a modulus G' of at least $10^6$ Pa and the G' changes by not more than 10% within 6 hours.

Isocyanate Polymer C

In a preferred embodiment, the catalytic polymerization with a catalyst B1 suitable according to the invention leads to a product having a glass transition temperature $T_g$ between 0° C. and 90° C. More preferably, the glass transition temperature is between 10° C. and 70° C.; most preferably, the glass transition temperature is between 25° C. and 60° C.

This product has a modulus G' determined by a plate/plate rheometer to ISO 6721-10:2015-09 at a frequency of 1/s at 23° C. of at least $1*10^6$ Pa, preferably at least $5*10^6$ Pa and more preferably at least $1*10^7$ Pa, and is thus dry and can thus be stacked without blocking against surfaces not covered by the reaction mixture.

In a further embodiment of the process according to the invention, the polyisocyanate polymer C has a glass transition temperature in the region of +/−30° of the ambient temperature that exists in the catalytic polymerization.

In a particularly preferred embodiment of the process according to the invention, the polyisocyanate polymer C has a glass transition temperature corresponding at least to the ambient temperature that exists in the catalytic polymerization. It is particularly preferable that the glass transition temperature of the polyisocyanate polymer at the end of the catalytic polymerization and at the start of the catalytic trimerization defined further down in this application is not more than 60° C.

It is preferable that the polyisocyanate polymer C has at least 5% by weight of uretdione groups, based on the amount of isocyanate groups in the polyisocyanate composition A, for further reaction to give the polyisocyanurate plastic D.

It has been found to be of particular practical relevance to perform the catalytic polymerization of the polyisocyanate composition A up to a degree of conversion where more than 10%, especially more than 20%, more preferably more than 30%, of the isocyanate groups originally present in the polyisocyanate composition A are still in the form of free or reversibly blocked isocyanate groups in the form of uretdione groups, where G' of the resultant polyisocyanate polymer C is to be greater than $1*10^6$ Pa G". In other words, more than 10%, especially more than 20%, more preferably more than 30%, of the isocyanate groups originally present in the polyisocyanate composition A are still present in the polyisocyanate polymer C in a form that can be activated by catalyst B2 and converted to isocyanurate during the catalytic trimerization, under the given reaction conditions at a temperature of at least 100° C., preferably at least 120° C., more preferably at least 140° C. and most preferably at least 180° C.

In a preferred embodiment, the polyisocyanate polymer C at the end of the catalytic polymerization is already crosslinked to such a high degree that it cannot be fully dissolved in solvents.

Reshaping of the Polyisocyanate Polymer C

In a preferred embodiment of the invention, the polyisocyanate polymer C is reshaped between the catalytic polymerization and the catalytic trimerization or during the catalytic trimerization. The reshaping can be effected, for example, by heating the polyisocyanate polymer C above its glass transition temperature, especially 1° C. to 100° C. above its glass transition temperature, more preferably 10° C. to 50° C. above its glass transition temperature.

In a particular embodiment of the present invention, the temperature for the reshaping is chosen such that it is below the reaction temperature for the catalytic trimerization. Thus, the reshaped prepolymer C can be stored further and—if required—reshaped again prior to the final catalytic trimerization.

In another preferred embodiment, the reshaping step and the catalytic trimerization are associated with one another. The reshaping here is effected at an elevated temperature compared to the above embodiment. The temperature in the reshaping, in this alternative embodiment, is preferably in the region of the temperatures required for the catalytic trimerization. This is advantageous especially in the case of reshaping processes having a duration substantially less than the duration of the catalytic trimerization at the given temperature. For instance, the reshaping can be concluded before sufficient free or reversibly blocked isocyanate groups in the prepolymer C have been catalytically trimerized that reshaping is no longer possible owing to the hardness of the workpiece. Such a rapid reshaping step can be performed particularly advantageously with a heated press.

In a preferred embodiment of the present invention, the catalytic polymerization and the catalytic trimerization are performed in a continuous production process. Processes of particularly good suitability according to the invention are paint and adhesive application by means of rolling, doctor blading, spray heads, flow coating, printing in continuous coating systems, filament winding methods, pultrusion methods, prepregs methods, infusion methods, all these methods having the common factor that they include at least two different reaction temperatures and/or ambient temperatures.

In a further embodiment of the present invention, the catalytic polymerization and the catalytic trimerization are performed in a noncontinuous production process. Processes of particularly good suitability according to the invention are casting processes, infusion and injection processes, dipping and impregnating processes, and painting, printing or spraying.

Catalytic Trimerization

The process according to the invention for producing a polyisocyanurate plastic D comprises a process step in which the polyisocyanate polymer C is converted to the polyisocyanurate plastic D by catalytic trimerization over a period of not more than 48 hours, preferably not more than 24 hours, more preferably not more than 300 minutes and most preferably not more than 60 minutes, at a temperature of at least 100° C., preferably at least 120° C., more preferably at least 140° C. and most preferably at least 160° C.

In a preferred embodiment, the polyisocyanate polymer C is isolated as intermediate after conclusion of the catalytic polymerization. What is meant by "isolated" in the context of the invention is that intermediate is not converted to the polyisocyanurate plastic D at the site where it was produced. It is preferable when there is at least 10 m, more preferably at least 50 m, even more preferably at least 500 m and most preferably at least 1000 m between the site where the catalytic polymerization is conducted and the site where the catalytic trimerization is conducted.

In another preferred embodiment, the polyisocyanurate plastic D can also be produced by catalytic trimerization in situ from the polyisocyanate polymer C obtained by catalytic polymerization, i.e. directly after the catalytic polymerization. The transition from the catalytic polymerization to the catalytic trimerization here is triggered by an increase in temperature by at least 20° C.

A particular advantage of the two-stage process according to the invention is that the polyisocyanate polymer C is storage-stable over days or weeks when the ambient temperature is not more than 60° C., preferably not more than 40° C., more preferably not more than 30° C. and most preferably not more than 25° C.

In a particularly preferred embodiment of the present invention, there is an interval between the catalytic polymerization and the catalytic trimerization of 12 hours to 1 year, preferably of 2 days to 6 months, more preferably of 3 days to 3 months and in particular of at least 7 days to 2 months in which the prepolymer C is stored at temperatures of not more than 30° C., preferably not more than 20° C. Briefly exceeding the aforementioned storage temperatures is harmless provided that the combination of extent and duration of the increase in temperature does not lead to catalytic trimerization of more than 10% of the free or reversibly blocked isocyanate groups present in the polyisocyanate polymer C and the Tg of the polyisocyanate polymer C does not increase by more than 20° C. "Storage" in the context of this patent application includes a change of site, i.e. transport.

It has been found to be of particular practical relevance to start the catalytic trimerization by heating the polyisocyanate polymer C to temperatures of at least 100° C., preferably above 120° C., more preferably above 140° C. and especially preferably above 160° C. However, this temperature must not be above the breakdown temperature of the polyisocyanate polymer C or the polyisocyanurate plastic D. Therefore, the temperature of the material during the catalytic trimerization does not exceed a temperature of 400° C., preferably 300° C., more preferably 280° C.

It has been found to be of particular practical relevance to perform the catalytic trimerization by heating the polyisocyanate polymer C to temperatures above the glass transition temperature of the polyisocyanurate D to be formed. In other words, the trimerization is performed at temperatures corresponding at least to the glass transition temperature of the fully cured polyisocyanurate plastic D, preferably at a temperature of at least 10° C., more preferably at least 30° C. and especially at least 60° C. above the glass transition temperature of the polyisocyanurate plastic D. The abovementioned upper temperature limits are observed here. The Tg of the fully cured polyisocyanurate plastic may appropriately be read off from the second heating cycle of the DSC measurement, preferably in a temperature program from 20° C. to 250° C. at a heating rate of 20° C./minute and a cooling rate of 50° C./minute, since the Tg of the fully cured polyisocyanurate plastic D typically becomes visible here.

In a preferred embodiment of the invention, the catalytic trimerization is effected in the without prior deactivation of catalyst B1. More particularly, according to the invention, the catalytic trimerization takes place in the presence of catalyst B1 and of catalyst B2.

In another preferred embodiment of the invention, the catalytic trimerization is effected after deactivation, preferably by oxidation, of catalyst B1.

The trimerization reaction of the polyisocyanate polymer C to give the polyisocyanurate plastic D is preferably continued until at least 80%, preferably at least 90%, more preferably at least 95%, of the free isocyanate groups originally present in the polyisocyanate composition A have reacted. In other words, there are preferably only not more than 20%, not more than 10%, more preferably not more than 5%, of the isocyanate groups originally present in the polyisocyanate composition A still present in the polyisocyanurate plastic D according to the invention. The percentage of isocyanate groups still present can be determined by a comparison of the content of isocyanate groups in the original polyisocyanate composition A with the content of isocyanate groups in the reaction product, for example by the aforementioned comparison of the peak maxima of the isocyanate band at about 2270 $cm^{-1}$ by means of ATR spectroscopy.

The trimerization reaction of the polyisocyanate polymer C to give the polyisocyanurate plastic D in step c) is also preferably continued until at least 20% by weight, preferably at least 40% by weight and more preferably at least 50% by weight of the uretdione groups formed in the catalytic polymerization have been converted to polyisocyanurate groups. The percentage of uretdione groups still present can be determined by a comparison of the content of uretdione groups in the original polyisocyanate polymer C with the content of uretdione groups in the reaction product D, for example by the aforementioned comparison of the normalized peak maxima of the uretdione band at about 1765 $cm^{-1}$ by means of ATR spectroscopy.

It is known that the peak heights in the ATR spectrum do not give absolute concentration values, but they give values of good reproducibility that can be correlated to absolute concentrations if required.

For this purpose, the change in the "isocyanurate concentration", "isocyanate concentration" and "uretdione concentration" in the ATR spectrum is determined with normalization with respect to the CH vibrations at 2700-3100, with the peak height of the peak maximum of the absorption band of the respective functional group (isocyanurate, isocyanate, uretdione) in compound C set at 1 in each case.

In a preferred embodiment, the polyisocyanurate plastic D has a normalized peak height of the maximum of the isocyanurate band of D>C, preferably >1.05*C, more preferably >1.1*C and most preferably >1.2*C, a peak height of the maximum of the uretdione band of D<C, preferably <0.8*C, more preferably <0.6*C and most preferably <0.5*C, and a peak height of the maximum of the isocyanate band of D<C, preferably <0.9*C, more preferably <0.5*C and most preferably <0.3*C.

The result of the trimerization reaction of C is preferably a product having an isocyanurate content based on the proportion of polymerizable constituents in the starting composition A of at least 10% by weight, preferably at least 15% by weight, more preferably at least 20% by weight.

In a preferred embodiment, the trimerization reaction of the polyisocyanate polymer C to give the polyisocyanurate plastic D is continued until, even in a subsequent heat treatment at a temperature 20° C. above the trimerization temperature for one hour, there is no change in the Tg of the polyisocyanurate plastic by not more than 15° C., preferably not more than 10° C. and more preferably not more than 5° C.

For reasons of efficiency, it has been found to be particularly desirable to perform the catalytic trimerization over a minimum period of time. It is therefore preferable to conclude the trimerization, with adjustment of the reaction temperature within the range formulated above, within not more than 60 min, preferably within not more than 30 min, more preferably within not more than 10 min and especially within not more than 5 min. At best, the catalytic trimerization of the polyisocyanate polymer C is concluded within not more than 2 min.

Since isocyanurate formation, depending on the catalyst used, is frequently accompanied by side reactions, for example dimerization and further reaction to give carbodiimide structures or trimerization to form iminooxadiazinediones (so-called asymmetric trimers), and by allophanatization reactions in the case of presence of urethane groups in the starting polyisocyanate, the term "catalytic trimerization" shall also synonymously represent these reactions that proceed additionally in the context of the present invention.

In a particular embodiment, however, "catalytic trimerization" means that predominantly cyclotrimerizations of at least 50%, preferably at least 60%, more preferably at least 70% and especially at least 80% of isocyanate groups present in the polyisocyanate composition A at the start of this process step are catalyzed to give isocyanurate structural units at the end of the catalytic trimerization. However, side reactions, especially those to give carbodiimide, uretdione, allophanate and/or iminooxadiazinedione structures, typically occur and can even be used in a controlled manner in order to advantageously affect, for example, the Tg value of the polyisocyanurate plastic obtained.

Polyisocyanurate Plastic D

The product of the catalytic trimerization is the polyisocyanurate plastic D with a glass transition temperature at least 10° C., preferably at least 25° C., more preferably at least 40° C. and most preferably at least 50° C. above that of the polyisocyanate polymer C. The absolute glass transition temperature of the isocyanurate plastic D is preferably between 60 and 400° C., more preferably between 90 and 300° C. and especially preferably between 100 and 280° C. The glass transition temperature is determined via DSC in the first heating cycle.

A polyisocyanurate plastic D according to the invention is a plastic containing polyisocyanurate groups in a proportion of at least 10% by weight, preferably at least 15% by weight and most preferably at least 20% by weight, based on the proportion of polymerizable constituents in the starting composition A. Blends of polyisocyanurates and other plastics are likewise covered by the term "polyisocyanurate plastic" if they contain the specified percentages by weight of polyisocyanurates and have been produced by the process according to the invention.

When reference is made here to "plastic", this means a product which is very substantially dimensionally stable at room temperature—by contrast, for example, with gels or liquids. The term "plastic" as used here includes all customary classes of plastic, i.e. especially including thermosets, thermoplastics and elastomers.

A "polyisocyanurate plastic" as used here is any molecule, preferably a polymer, having a plurality of isocyanurate structural units, for example at least 10 isocyanurate structural units. A molecule having a single isocyanurate structural unit can be referred to as "isocyanurate".

The characteristic cyclic isocyanurate structural unit is shown in the following structural formula:

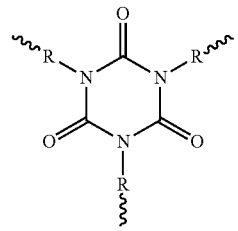

By the process according to the invention, it is possible in a very efficient manner to obtain homogeneous, blister-free solids made of polyisocyanurate plastic. The degree of freedom of a solid from blisters can be specified via the density. The polyisocyanurate plastic solids according to the invention especially feature a density of greater than 1.00 $g/cm^3$, determined in accordance with DIN EN ISO 1183-1. The process according to the invention especially affords solids having a density of greater than 1.10 $g/cm^3$, preferably greater than 1.15 $g/cm^3$.

Composites

In a preferred embodiment of the present invention, the reaction mixture provided for production of the polyisocyanate polymer C additionally comprises at least one fibrous filler F.

These fillers F are preferably used in amounts of at least 1% by volume, preferably at least 5% by volume, more preferably at least 15% by volume, even more preferably at least 25% by volume, especially at least 35% by volume, calculated as the total volume of fillers F used based on the total volume of the polyisocyanate polymer C (or of the polyisocyanurate plastic D). If a filler F is added, however, the amount thereof is not more than 90% by volume, based on the total volume of the polyisocyanate polymer C (or of the polyisocyanurate plastic D).

Fibrous fillers F may consist of organic or inorganic fibers. Inorganic fibers suitable according to the invention are glass fibers, basalt fibers, boron fibers, ceramic fibers, whiskers, silica fibers and metallic reinforcing fibers. Organic fibers suitable according to the invention are aramid fibers, carbon fibers, polyester fibers, nylon fibers and Plexiglas fibers. Natural fibers suitable according to the invention are flax fibers, hemp fibers, wood fibers, cotton fibers, cellulose fibers and sisal fibers.

In a preferred embodiment of the invention, a fibrous filler F selected from the group consisting of glass fibers, aramid fibers, basalt fibers, carbon fibers and mixtures thereof is used. In a particularly preferred embodiment of the invention, the fibrous fillers used are glass fibers and/or carbon fibers, especially glass fibers.

Semifinished Product

In a further embodiment, the present invention relates to a process for producing a semifinished product, comprising the steps of
- a) providing a reaction mixture having a molar ratio of isocyanate groups to isocyanate-reactive groups of at least 3:1, containing
  - (i) a polyisocyanate composition A,
  - (ii) a catalyst B1 that catalyzes the reaction of isocyanate groups to give uretdione groups, and
  - (iii) a catalyst B2 that catalyzes the reaction of isocyanate and uretdione groups to give isocyanurate groups, where catalyst B1 is different than catalyst B2;
- b) wetting a fiber, a woven fabric, a nonwoven scrim or a knit with the reaction mixture provided in process step a); and
- c) catalytically polymerizing the polyisocyanate composition A to give a polyisocyanate polymer C that forms a layer on the fiber, the woven fabric, the nonwoven scrim or the knit and is characterized by
  - (i) the presence of uretdione groups; and
  - (ii) a modulus G' of the polyisocyanate polymer C determined by a plate/plate rheometer to ISO 6721-10:2015-09 at 1/s at 23° C. of $\geq 1*10^6$ Pa;
  - wherein the catalytic polymerization is conducted at an average temperature of not more than 100° C. over a period of 30 min up to 14 days.

All definitions given further up in this application for the composition of the reaction mixture, its individual components and the catalytic polymerization are also applicable to these embodiments. Fibers suitable for production of the woven fabric, a nonwoven scrim or knit are those that have already been described above in connection with the fibrous filler F.

The wetting of a fiber, a woven fabric, a nonwoven scrim or a knit with the reaction mixture can be effected by all of the methods known to the person skilled in the art.

In a further process step of the catalytic trimerization, the semifinished product obtained in process step c) can be processed further in the same way as the isocyanate polymer C defined above. Prior to the catalytic trimerization, the semifinished product according to the invention can be stored or reshaped in the same way as the polyisocyanate polymer C.

The present invention further relates to a semifinished product obtainable by the process defined above.

Compared to the known systems based on epoxides or vinyl esters, the semifinished products according to the invention have the advantage that they need not be stored at temperatures below the freezing point, but are stable for several days or even months at the storage temperatures defined further up in this application.

In a first aspect, the present patent application relates to a process for producing a semifinished product, comprising the steps of
- a) providing a reaction mixture having a molar ratio of isocyanate groups to isocyanate-reactive groups of at least 3:1, containing
  - (i) a polyisocyanate composition A,
  - (ii) a catalyst B1 that catalyzes the reaction of isocyanate groups to give uretdione groups, and
  - (iii) a catalyst B2 that catalyzes the reaction of isocyanate and uretdione groups to give isocyanurate groups, where catalyst B1 is different than catalyst B2;
- b) wetting a fiber, a woven fabric, a nonwoven scrim or a knit with the reaction mixture provided in process step a); and
- c) catalytically polymerizing the polyisocyanate composition A to give a polyisocyanate polymer C that forms a layer on the fiber, the woven fabric, the nonwoven scrim or the knit and is characterized by
  - (i) the presence of uretdione groups; and
  - (ii) a modulus G' of the polyisocyanate polymer C determined by a plate/plate rheometer to ISO 6721-10:2015-09 at 1/s at 23° C. of $\geq 1*10^6$ Pa;
  - wherein the catalytic polymerization is conducted at an average temperature of not more than 100° C. over a period of 30 min up to 14 days.

In a second aspect, the present patent application relates to a process for producing a composite material having a matrix comprising a polyisocyanurate plastic, comprising process steps a) to c) from aspect 1 and additionally a process step d) comprising the catalytic trimerization of polyisocyanate polymer C to give a polyisocyanurate plastic D at a temperature of at least 100° C., this temperature being at least 20° C. higher than the temperature at which the catalytic polymerization was performed in process step c).

In a third aspect, the present patent application relates to a process for producing a polyisocyanurate plastic D, comprising the steps of
- a) providing a polyisocyanurate polymer C,
  - (i) containing uretdione groups;
  - (ii) containing a catalyst B2 that catalyzes the reaction of uretdione groups to give isocyanurate groups; and
  - (iii) characterized by a modulus G' determined by a plate/plate rheometer to ISO 6721-10:2015-09 at 1/s at 23° C. of at least $1*10^6$ Pa;
- b) catalytically trimerizing polyisocyanate polymer C to give a polyisocyanurate plastic D at a temperature between 100° C. and 400° C., this temperature being at least 20° C. higher than the temperature at which the catalytic polymerization to prepare the polyisocyanate polymer C was performed.

In a fourth aspect, the present patent application relates to the process according to aspect 3, wherein process step a) includes the following process steps a1) and a2):

a1) providing a reaction mixture having a molar ratio of isocyanate groups to isocyanate-reactive groups of at least 3:1, containing
  (i) a polyisocyanate composition A,
  (ii) a catalyst B1 that catalyzes the reaction of isocyanate groups to give uretdione groups, and
  (iii) a catalyst B2 that catalyzes the reaction of isocyanate and uretdione groups to give isocyanurate groups, where catalyst B1 is different than catalyst B2; and
a2) catalytically polymerizing the polyisocyanate composition A to give a polyisocyanate polymer C which is characterized by
  (i) the presence of uretdione groups; and
  (ii) a modulus G' determined by a plate/plate rheometer to ISO 6721-10:2015-09 at 1/s at 23° C. of $\geq 1*10^6$ Pa;
wherein the polymerization is conducted at an average temperature of not more than 100° C. over a period of 30 min up to 14 days.

In a fifth aspect, the present patent application relates to the process according to aspect 4, wherein the polyisocyanate polymer C is provided in process step a) at a site at least 10 m removed from the site at which the catalytic trimerization in process step b) is effected.

In a sixth aspect, the present patent application relates to the process according to any of aspects 3 to 5, wherein the polyisocyanate polymer provided in process step a) is reshaped prior to the performance of the catalytic trimerization in process step b).

In a seventh aspect, the present patent application relates to the process according to any of aspects 1 to 6, wherein the proportion of aliphatically and cycloaliphatically bonded isocyanate groups in the polyisocyanate composition A based on the total amount of all isocyanate groups present therein is at least 80 mol %.

In an eight aspect, the present patent application relates to the process according to any of aspects 1 to 7, wherein the catalyst B2, at temperatures of not more than 60° C., by comparison with catalyst B1, has a reaction rate coefficient for the conversion of isocyanate groups $k(T)_{ISOB2}$ that is at least a factor of 2 less than the reaction rate coefficient $k(T)_{ISOB1}$.

In a ninth aspect, the present patent application relates to the process according to any of aspects 1 to 8, wherein the polyisocyanate polymer C has a glass transition temperature of not more than 60° C.

In a tenth aspect, the present patent application relates to an isocyanurate plastic obtainable by the process according to any of aspects 3 to 6.

In an eleventh aspect, the present patent application relates to semifinished product obtainable according to aspect 1.

In a twelfth aspect, the present patent application relates to the use of the process according to any of aspects 3 to 6 for production of coatings, films or moldings comprising the polyisocyanurate plastic D.

In a thirteenth aspect, the present patent application relates to coatings, films, semifinished products or moldings comprising the polyisocyanurate plastic D prepared by the process according to any of aspects 3 to 6.

The examples which follow serve merely to elucidate the invention in detail. They are not intended to limit the scope of protection of the patent claims in any way.

EXAMPLES

General Information:
Unless otherwise stated all reported percentage values are in percent by weight (% by weight).

The ambient temperature of 23° C. at the time of performing the experiments is referred to as RT (room temperature).

The NCO functionality of the various raw materials was titrated or taken from the respective datasheet for the raw material.

Test Methods:
The methods detailed hereinafter for determination of the appropriate parameters were used for performance and evaluation of the examples and are also the methods for determination of the parameters of relevance according to the invention in general.

Determination of Viscosity, Storage Modulus:
The complex viscosity and the G' of a small amount of the reactive resin material including the added catalyst was measured at 23° C. with a plate/plate rheometer to ISO 6721-10:2015-09 at a frequency of 1/s.

The pot life is the period within which the starting viscosity of the sample, defined as the viscosity after the end of mixing operation, has tripled.

The mixing operation generally takes between 30 seconds and 10 minutes.

Determination of NCO Concentration:
The NCO contents were determined by titrimetry according to DIN EN ISO 11909.

ATR-IR Measurements:
The free NCO groups, the uretdione groups and isocyanurate groups were measured using an FT-IR spectrometer (Tensor II) from Bruker. The sample film was contacted with the platinum ATR unit. The contacted area of the sample is 2×2 mm. Depending on the wavenumber, the IR radiation penetrates 3-4 μm into the sample in the measurement. An absorption spectrum was then obtained from the sample. In order to compensate for nonuniform contacting of the samples of different hardness, a baseline correction and a normalization in the wavenumber range of 2700-3100 $cm^{-1}$ (CH2, CH3) was performed on all spectra.

The peak intensity of the NCO group signal was determined at about 2264 $cm^{-1}$.

The peak intensity of the uretdione group signal was determined at about 1765 $cm^{-1}$.

The peak intensity of the isocyanurate group signal was determined at about 1674 $cm^{-1}$.

Determination of Monomer Concentration:
The monomer contents and extractable constituents were determined by means of a gas chromatograph from the samples extracted with acetone at 23° C. for 7 days against hexamethylene diisocyanate as standard.

DSC Analysis:
DSC measurements and glass transition temperature Tg were determined by means of DSC (differential scanning calorimetry) with a Mettler DSC 12E (Mettler Toledo GmbH, Giessen, Germany) at a heating rate of 20° C./min. The temperature range chosen was from −20° C. to 250° C.

The Tg of the polyisocyanurate polymers according to the invention after complete curing was determined at a heating rate of 20° C./minute from 20° C. to 250° C. and at a cooling rate of 50° C./minute from 250° C. to 20° C. in the second heating cycle. Complete curing is assumed when the Tg does not change by more than 5° C. between successive heating cycles.

Reaction Temperature:

The reaction temperature was determined by two methods.

For discontinuous sample temperature measurements in the range of 20-250° C., the "Testo 845" IR thermometer was used.

For continuous temperature measurements in the range of 20-250° C., the Testo 735-2 temperature logger with thermocouple K was used.

The type of test method is stated in each of the experiments.

Starting Compounds:

Isocyanate 1:

Isocyanate 1 is an isocyanurate which is based on hexamethylene 1,6-diisocyanate (HDI) and was prepared analogously to example 11 of the application EP-A 330 966, except that the catalyst solvent used was 2-ethylhexane-1, 3-diol rather than 2-ethylhexanol.

NCO content: 22.9% by weight
NCO functionality: 3.2
HDI monomer content: 0.1% by weight
Viscosity (23° C.): 1200 mPas (DIN EN ISO 3219/A.3)

Isocyanate 2:

Isocyanate 2 is a mixture of 2 isocyanurates and was prepared in 2 steps.

Step 1: Firstly, isophorone diisocyanate (IPDI) was trimerized analogously to example 2 of application EP-A-0 003 765 until an NCO content of 31.1% by weight had been attained. The excess IPDI was removed by means of thin-film distillation at 170° C./0.1 mbar and, after cooling, an almost colorless polyisocyanurate having the following properties was obtained:

NCO content: 16.4% by weight
NCO functionality: 3.3
Melting point: 100-110° C.
IPDI monomer content: 0.2% by weight Step 2: The solid trimer obtained was then coarsely comminuted and introduced together with isocyanate 1 into a reaction vessel at room temperature under a nitrogen atmosphere. The mixture was heated to 100 to 140° C. while stirring, such that the solids dissolved and an almost clear solution was obtained, which after cooling to 50° C. was filtered through a 200 micron filter. The amounts used were chosen such that, for instance, a total NCO content of about 21% by weight was attained.

NCO content: 21.0% by weight
NCO functionality: 3.2
HDI monomer content: 0.07% by weight
IPDI monomer content: 0.06% by weight
Viscosity (23° C.): 22500 mPas (DIN EN ISO 3219/A.3)

The whG02J1(88wGLrh)G00J1 release liner was sourced from Mondi.

The 92105 ITG_027, EC9-68 tex glass fiber weave of 163 g/m$^2$ was sourced from P-D INTERGLAS TECHNOLOGIES GmbH.

Polyethylene glycol 400 was sourced with a purity of >99% by weight from ACROS.

Potassium acetate was sourced with a purity of >99% by weight from ACROS.

18-Crown-6 crown ether for synthesis was sourced from Merck and used as obtained.

N,N,N'-Trimethylaminoethylethanolamine having an OH number of 384 mg KOH/g was sourced from Huntsman Corporation.

Catalyst B1:

Trioctylphosphine was sourced from Sigma-Aldrich with a purity of >90% by weight.

Catalyst B2a:

Potassium acetate (50.0 g) was stirred in the PEG 400 (950.0 g) at 23° C. under protective gas atmosphere until it had dissolved completely. This afforded a 5% by weight solution of potassium acetate in PEG 400 which was used as catalyst without further treatment.

Catalyst B2b: Potassium acetate (0.177 g), 18-crown-6 crown ether (0.475 g) were stirred in diethylene glycol (3.115 g) at 23° C. under protective gas atmosphere until the potassium acetate had dissolved completely.

Catalyst B2c: Isocyanate 1 (18.3 g) was added dropwise to N,N,N'-trimethylaminoethylethanolamine (14.6 g) under cooling, and the mixture was stirred until homogeneous and until no residual isocyanate was detectable any longer by IR analysis.

Unless stated otherwise, the catalysts were stored under nitrogen.

The raw materials used, unless stated otherwise, were degassed prior to use at a reduced pressure of <100 mbar while stirring for at least 12 h.

Experiments according to the invention are additionally identified by*.

Working Example 1*

Isocyanate 1 (96.0 g), B1 (2.0 g) and B2a (2.0 g) were mixed intimately at room temperature by means of a Speed-Mixer DAC 400.1 FVZ (from Hauschild, DE) in a 200 mL beaker at 2000 revolutions per minute for one minute.

The reaction mixture was left to stand in the mixing beaker at 23° C. for 12 h, and reacted to give a dry hard solid material. The temperature of the reaction mixture remained below 60° C. when measured in cycles of one hour each within the first 6 h by means of an IR thermometer. The solid material was examined by means of DSC analysis after 3 days. The first heating operation showed a first broad glass transition temperature (Tg) at about 52° C. In the second and third heating operations, a Tg was found at 106° C. and 110° C. respectively. The entirety of the curing thus took place in the DSC.

Working Example 2*

Isocyanate 1 (96.0 g), B1 (2.0 g) and B2a (2.0 g) were mixed intimately in a 200 mL beaker at room temperature by means of a Speed-Mixer DAC 400.1 FVZ (from Hauschild, DE) at 2000 revolutions per minute for one minute.

The reaction mixture was left to stand in the mixing beaker at 23° C. for 6 h, and reacted to give a dry rubberlike solid material. The temperature of the reaction mixture remained below 60° C. when measured in cycles of one hour each by means of an IR thermometer. A portion of the solid material obtained (about 10.0 g) was removed from the mixing beaker by means of a bandsaw and was heated in an oven at 190° C. for 30 min. The oven afforded a cured polyisocyanurate plastic having a Tg of 107° C.

Working Example 3*

Isocyanate 1 (97.5 g), B1 (2.0 g) and B2a (0.5 g) were mixed intimately in a 200 mL beaker at room temperature by means of a Speed-Mixer DAC 400.1 FVZ (from Hauschild, DE) at 2000 revolutions per minute for one minute.

The reaction mixture was left to stand in the mixing beaker at 23° C. for 24 h, and reacted to give a dry hard solid material. The temperature of the reaction mixture remained below 60° C. when measured in cycles of one hour each within the first 6 h by means of an IR thermometer.

A portion of the solid material obtained (about 10.0 g) was removed from the mixing beaker by means of a bandsaw and was heated in an oven at 190° C. for 30 min. The oven afforded a cured polyisocyanurate plastic having a Tg of 102° C.

Working Example 4*

Isocyanate 1 (97.5 g), B1 (0.5 g) and B2a (2.0 g) were mixed intimately in a 200 mL beaker at room temperature by means of a Speed-Mixer DAC 400.1 FVZ (from Hauschild, DE) at 2000 revolutions per minute for one minute.

The reaction mixture was left to stand in the mixing beaker at 23° C. for 24 h, and reacted to give a dry rubberlike solid material. The temperature of the reaction mixture remained below 50° C. when measured in cycles of one hour each within the first 6 h by means of an IR thermometer.

A portion of the solid material obtained (about 10.0 g) was removed from the mixing beaker by means of a bandsaw and was heated in an oven at 190° C. for 30 min. The oven afforded a cured polyisocyanurate plastic having a Tg of 108° C.

Working Example 5*

A prepreg was produced using an EHA Pre-Preg laboratory system (from EHA Composite Machinery GmbH). For this purpose, isocyanate 2 (725.0 g) was mixed with B1 (10.2 g) and B2a (14.5 g) at 23° C. by means of a stirrer with substantial avoidance of bubbles. Subsequently, the reactive resin mixture was applied to a release liner (whG02J1 (88wGLrh)G00J1 from Mondi) as a thin film of thickness of about 0.06 mm, and the glass fiber textile (92105 ITG_027, EC9-68 tex from P-D INTERGLAS TECHNOLOGIES GmbH; 163 g/m$^2$) was pressed onto the release liner coated with reaction mixture by means of various rolls and hence impregnated. The takeoff speed was 2 m/min. The prepreg thus produced was rolled up and sealed in an aluminum package, then stored first at room temperature for 6 h and then at −20° C.

After 32 days, a portion of the prepreg was examined. For this purpose, the portion of the prepreg was acclimatized to room temperature and unpacked. The prepreg had a dry elastic rubberlike consistency.

ATR measurement showed a decrease in free isocyanate groups and an increase in uretdione groups. 4 layers were placed one on top of another at a 90° offset and pressed in a heating press at 200° C. for 10 min. The result was a compact, hard plate, the layers of which could not be separated by hand. DSC gave a Tg of 103° C. ATR measurements were again conducted on the finished isocyanurate plastic, which no longer showed any signals for the presence of free isocyanate groups or uretdione groups. A second examination of the prepreg was conducted analogously after 192 days, which led to the same results.

Examples 6 to 10, Experiments According to the Invention are Identified by*

By the method described in example 1, 100 g of the starting polyisocyanate 1 in each case was mixed with different amounts of B1 and B2b and cast between two glass plates separated by 2 mm and sealed with a silicone band and trimerized to give polyisocyanurate plastics at the temperatures and times specified.

Table 1 below shows the compositions of the reaction mixtures, reaction conditions and characteristic properties of the cured products:

TABLE 1

| Example | 6 | 7* | 8 | 9* | 10 |
|---|---|---|---|---|---|
| Starting polyisocyanate | 1 | 1 | 1 | 1 | 1 |
| B1 (% by wt.) | 1 | 1 | 0.5 | 0.5 | — |
| B2b (% by wt.) | 0.5 | 0.5 | — | 3 | 3 |
| Temperature/° C.; time/d | 23/28 | 23/26 | 23/26 | 23/26 | — |
| Temperature/° C.; time/min | — | 120/920 | 150/30 | 180/30 | 180/30 |
| Isocyanurate/uretdione/ | 14.7 | 15.2 | 14.8 | 16.4 | 16.8 |
| ISO* | 2.3 | 0.1 | 1.3 | 0.1 | 0 |
|  | 2.1 | 0.9 | 2.5 | 0.1 | 0 |
| Tg | 55 | 104 | 44 | 106 | 110 |

*ATR-IR: peak height after normalization to CH vibrations and baseline correction Comparative Example 11

Isocyanate 1 (98.0 g) and B2a (2.0 g) were mixed intimately at room temperature by means of a Speed-Mixer DAC 400.1 FVZ (from Hauschild, DE) at 2000 revolutions per minute for one minute. After storage at 23° C. in the mixing beaker for 3 days, a tacky mass was still obtained.

A portion of the reaction mixture was removed from the beaker (10.0 g) and was heated in an oven at 190° C. for 30 min. The treatment gave a cured polyisocyanurate plastic having a Tg of 108° C.

Comparative Example 12

Isocyanate 1 (98.0 g) and B1 (2.0 g) were mixed intimately at room temperature by means of a Speed-Mixer DAC 400.1 FVZ (from Hauschild, DE) at 2000 revolutions per minute for one minute.

The reaction mixture was left to stand in the mixing beaker at 23° C. for 24 h, and reacted to give a dry solid material.

A portion of the solid material obtained (10.0 g) was removed from the mixing beaker by means of a bandsaw and was heated in an oven at 190° C. for 30 min. The oven again gave a mass that was tacky at the surface.

Comparative Example 13

Isocyanate 1 (99.5 g) and B1 (0.5 g) were mixed intimately at room temperature by means of a Speed-Mixer DAC 400.1 FVZ (from Hauschild, DE) at 2000 revolutions per minute for one minute. The reaction mixture was left to stand in the mixing beaker at 23° C. for 24 h, and reacted to give a dry solid material.

A portion of the solid material obtained (10.0 g) was removed from the mixing beaker by means of a bandsaw and was heated in an oven at 190° C. for 60 min. The oven again gave a mass that was tacky at the surface.

Comparative Example 14

Isocyanate 1 (20 g), B1 (0.5% by weight) and B2b (2% by weight) were mixed intimately at room temperature by means of a Speed-Mixer DAC 400.1 FVZ (from Hauschild, DE) at 2000 revolutions per minute for one minute. After storage at 23° C. in the mixing beaker for 1 day, a mass with a Tg of 52° C. was obtained.

Working Example 15*

Isocyanate 1 (20 g), B1 (1.5% by weight) and B2c (1.13% by weight) were mixed intimately at room temperature by means of a Speed-Mixer DAC 400.1 FVZ (from Hauschild, DE) at 2000 revolutions per minute for one minute.

The reaction mixture was left to stand in the mixing beaker at 23° C. for 24 h, and reacted to give a dry solid material.

A portion of the solid material obtained (10.0 g) was removed from the mixing beaker by means of a bandsaw and was heated in an oven at 220° C. for 5 min. The oven afforded a solid material having a Tg of 93° C.

Comparative example 11 shows clearly that trimerization catalyst B2 on its own is virtually unreactive or has only very low reactivity at room temperature. On the other hand, the same catalyst B2 at 190° C. has very high reactivity and crosslinks the reactive resin completely within a few minutes to give the polyisocyanurate plastic. By contrast, catalyst B1 shows distinct activity at room temperature and polymerizes the free isocyanate groups within a few hours to days depending on the concentration (comparative examples 12, 13 and 14). On the other hand, the catalytic activity of catalyst B1 does not appear to rise significantly even at high temperatures, and it is not capable of fully crosslinking the reactive resin to give a polyisocyanurate plastic; in fact, reformation of isocyanates is observed, which can be detected by ATR, but are also manifested by the formation of a tacky layer at the surface of the specimen (comparative examples 12 and 13).

Working example 1, with use of catalyst B1 and catalyst B2a, shows clearly that a polyisocyanate polymer having a Tg of about 40° C. to 60° C. is initially formed in the reaction vessel used at ambient temperature with the amounts of reactants used. The reaction temperature here has not exceeded 60° C. during the reaction. It is also shown that, when the temperature is further increased to 190° C., the uretdione groups and free isocyanate groups present are largely converted to isocyanurate groups. The polyisocyanurate groups are stable, and no significant change in the Tg was observed even after the 2nd or 3rd heating operation in the DSC.

Working examples 2, 3 and 4 show that the times for the preparation of the prepolymer in particular can be adjusted and optimized by means of variation of the catalyst concentration. The energy of reaction released, owing to the long duration of the first crosslinking, can effectively be released via the surface to the environment, such that distinct heating of the sample is avoided.

Working example 15 shows that the use of different catalysts is possible for this two-stage process. This affords a material with a high Tg.

Working example 5 shows a practical application of the two-stage curing process with formation of an intermediate polyisocyanate polymer for the production and use of prepregs. Particularly the long storage with retention of the properties of the prepreg means that industrial utilization of the process is of great interest.

The invention claimed is:

1. A process for producing a semifinished product, comprising
 a) providing a reaction mixture comprising a component having isocyanate-reactive groups, wherein a molar ratio of isocyanate groups to isocyanate-reactive groups is at least 3:1, the reaction mixture comprising
  (i) a polyisocyanate composition A,
  (ii) a catalyst B1 that catalyzes the reaction of isocyanate groups to give uretdione groups, and
  (iii) a catalyst B2 that catalyzes the reaction of isocyanate and uretdione groups to give isocyanurate groups, wherein catalyst B1 is different than catalyst B2;
 b) wetting a fiber, a woven fabric, a nonwoven scrim or a knit with the reaction mixture; and
 c) catalytically polymerizing the polyisocyanate composition A to give a polyisocyanate polymer C that forms a layer on the fiber, the woven fabric, the nonwoven scrim or the knit, wherein the polyisocyanate polymer C has a modulus G" of $\geq 1*10^6$ Pa as determined by a plate/plate rheometer at 1/s at 23° C. based on ISO 6721-10:2015-09 and comprises uretdione groups; and
 wherein the catalytic polymerization is conducted at an average temperature of not more than 100° C. over a period of 30 minutes up to 14 days.

2. A process for producing a composite material having a matrix comprising a polyisocyanurate plastic, comprising
 a) providing a reaction mixture comprising a component having isocyanate-reactive groups, wherein a molar ratio of isocyanate groups to isocyanate-reactive groups is at least 3:1, the reaction mixture comprising
  (i) a polyisocyanate composition A,
  (ii) a catalyst B1 that catalyzes the reaction of isocyanate groups to give uretdione groups, and
  (iii) a catalyst B2 that catalyzes the reaction of isocyanate and uretdione groups to give isocyanurate groups, wherein catalyst B1 is different than catalyst B2;
 b) wetting a fiber, a woven fabric, a nonwoven scrim or a knit with the reaction mixture; and
 c) catalytically polymerizing the polyisocyanate composition A to give a polyisocyanate polymer C that forms a layer on the fiber, the woven fabric, the nonwoven scrim or the knit, wherein the polyisocyanate polymer C has a modulus G" of $\geq 1*10^6$ Pa as determined by a plate/plate rheometer at 1/s at 23° C. based on ISO 6721-10:2015-09 and comprises uretdione groups, and wherein the catalytic polymerization is conducted at an average temperature of not more than 100° C. over a period of 30 minutes up to 14 days; and
 d) comprising catalytically trimerizing polyisocyanate polymer C to give a polyisocyanurate plastic D at a temperature of at least 100° C., wherein the temperature in process step d) is at least 20° C. higher than the temperature in process step c).

3. A process for producing a polyisocyanurate plastic D, comprising
 a) providing a polyisocyanate polymer C having a modulus G" of at least $1*10^6$ Pa as determined by a plate/plate rheometer at 1/s at 23° C. based on ISO 6721-10:2015-09, comprising
  (i) uretdione groups; and
  (ii) a catalyst B2 that catalyzes the reaction of uretdione groups to give isocyanurate groups;
  obtained by
   a1) providing a reaction mixture comprising a component having isocyanate-reactive groups, wherein a molar ratio of isocyanate groups to isocyanate-reactive groups is at least 3:1, the reaction mixture comprising
    (i) a polyisocyanate composition A,
    (ii) a catalyst B1 that catalyzes the reaction of isocyanate groups to give uretdione groups, and
    (iii) a catalyst B2 that catalyzes the reaction of isocyanate and uretdione groups to give isocyanurate groups, wherein catalyst B1 is different than catalyst B2; and
   a2) catalytically polymerizing the polyisocyanate composition A to give the polyisocyanate polymer C;

wherein the polymerization to give the polyisocyanate polymer C is conducted at an average temperature of not more than 100° C. over a period of 30 minutes up to 14 days, and b) catalytically trimerizing polyisocyanate polymer C to give a polyisocyanurate plastic D at a temperature between 100° C. and 400° C., wherein the temperature in catalytically trimerizing polyisocyanate polymer C to give polyisocyanate plastic D is at least 20° C. higher than the temperature in catalytically polymerizing the polyisocyanate composition A to prepare the polyisocyanate polymer C.

4. The process as claimed in claim 3, wherein the polyisocyanate polymer C is provided in process step a) at a site at least 10 m removed from a site at which the catalytic trimerization in process step b) is performed.

5. The process as claimed in claim 3, wherein the polyisocyanate polymer C provided in process step a) is reshaped prior to performing the catalytic trimerization in process step b).

6. The process as claimed in claim 1, wherein a proportion of aliphatically and cycloaliphatically bonded isocyanate groups in the polyisocyanate composition A is at least 80 mol % based on a total amount of all isocyanate groups present therein.

7. The process as claimed in claim 1, wherein the catalyst B2, at temperatures of not more than 60° C., by comparison with catalyst B1, has a reaction rate coefficient for the conversion of isocyanate groups $k(T)_{ISOB2}$ that is at least a factor of 2 less than the reaction rate coefficient $k(T)_{ISOB1}$.

8. The process as claimed in claim 1, wherein the polyisocyanate polymer C has a glass transition temperature of not more than 60° C.

9. An isocyanurate plastic obtained by the process as claimed in claim 3.

10. A semifinished product obtained by the process as claimed in claim 1.

11. A coating, film, semifinished product or molding comprising the polyisocyanurate plastic D prepared by the process as claimed in claim 3.

12. The process as claimed in claim 1, wherein the component comprising isocyanate-reactive groups comprises the polyisocyanate composition A, the catalyst B1, the catalyst B2, or a combination thereof.

13. The process as claimed in claim 2, wherein the component comprising isocyanate-reactive groups comprises the polyisocyanate composition A, the catalyst B1, the catalyst B2, or a combination thereof.

14. The process as claimed in claim 3, wherein the component comprising isocyanate-reactive groups comprises the polyisocyanate composition A, the catalyst B1, the catalyst B2, or a combination thereof.

* * * * *

UNITED STATES PATENT AND TRADEMARK OFFICE
CERTIFICATE OF CORRECTION

PATENT NO. : 11,319,402 B2
APPLICATION NO. : 17/053822
DATED : May 3, 2022
INVENTOR(S) : Hocke et al.

It is certified that error appears in the above-identified patent and that said Letters Patent is hereby corrected as shown below:

In the Claims
Column 40 Line 7 Claim 1 delete "G" insert --G'--
Column 40 Line 32 Claim 2 delete "G" insert --G'--
Column 40 Line 46 Claim 3 delete "G" insert --G'--

Signed and Sealed this
Twenty-first Day of June, 2022

Katherine Kelly Vidal
*Director of the United States Patent and Trademark Office*